US007668380B2

(12) United States Patent
Marcellin et al.

(10) Patent No.: US 7,668,380 B2
(45) Date of Patent: Feb. 23, 2010

(54) RATE CONTROL OF SCALABLY CODED IMAGES

(75) Inventors: Michael W. Marcellin, Tucson, AZ (US); Ali Bilgin, Tucson, AZ (US)

(73) Assignee: DTS, Inc., Calabasas, CA (US)

( * ) Notice: Subject to any disclaimer, the term of this patent is extended or adjusted under 35 U.S.C. 154(b) by 972 days.

(21) Appl. No.: 11/131,709

(22) Filed: May 18, 2005

(65) Prior Publication Data

US 2006/0262984 A1   Nov. 23, 2006

(51) Int. Cl.
    *G06K 9/36*   (2006.01)
(52) U.S. Cl. ..................................... 382/232
(58) Field of Classification Search ............... 382/232
    See application file for complete search history.

(56) References Cited

U.S. PATENT DOCUMENTS

| 6,366,704 | B1 |   | 4/2002 | Ribas-Corbera |         |
|-----------|----|---|--------|---------------|---------|
| 6,529,631 | B1 |   | 3/2003 | Peterson et al. |       |
| 6,625,321 | B1 | * | 9/2003 | Li et al. ............... | 382/239 |
| 6,778,709 | B1 | * | 8/2004 | Taubman .............. | 382/240 |
| 7,496,234 | B2 | * | 2/2009 | Li ...................... | 382/232 |
| 2004/0047511 | A1 |   | 3/2004 | Tzannes |         |
| 2004/0146205 | A1 | * | 7/2004 | Becker et al. ........... | 382/232 |
| 2005/0010626 | A1 |   | 1/2005 | Laksono et al. |       |
| 2005/0010229 | A1 |   | 5/2005 | Becker et al. |       |
| 2005/0100226 | A1 | * | 5/2005 | Kajiwara et al. ......... | 382/232 |
| 2006/0008162 | A1 | * | 1/2006 | Chen et al. ............. | 382/239 |

FOREIGN PATENT DOCUMENTS

WO    PCT/CA00/00134 A2    8/2000

OTHER PUBLICATIONS

ITU-T REC. T. "JPEG 2000 Image Coding System", T.800/ISO/IEC 15444-1:2004.
Taubman, D.S and Marcellin, M.W. "JPEG2000: Image Compression Fundamentals," Kluwer, Boston, 2002.
Dagher, in "Resource-Constrained Rate Control for Motion JPEG2000," IEEE Transactions on Image processing, Dec. 2003.
International Search Report PCT/US06/17081—Sep. 26, 2006.

(Continued)

*Primary Examiner*—Wenpeng Chen
(74) *Attorney, Agent, or Firm*—Blake A. Welcher; William L. Johnson; Eric A. Gifford

(57) ABSTRACT

A method of rate-control for a sequence of scalably coded images having transform coefficients partitioned into coding units coded in a plurality of quality increments having respective significance values. The method defines subsets each having one or more coding units, at least one image contributing at least one coding unit to two or more subsets. A list of requirements (LOR) is set having a least one entry associated with each subset. The significance values are used to select quality increments to construct an admissible codestream that satisfies the LOR on the subsets. The quality increments may be selected to achieve high quality for different subsets subject to size requirements in the LOR. For certain requirements, the codestream will also exhibit approximately constant reconstructed image quality. The quality increments may also be selected to achieve small compressed sizes for different subsets subject to quality requirements in the LOR.

60 Claims, 9 Drawing Sheets

OTHER PUBLICATIONS

Written Opinion PCT/US06/17081—Sep. 26, 2006.

De Vleeschouwer C et al: "A fuzzy logic system for content-based bit-rate allocation" Signal Processing. Image Communication, Elsevier Science Publishers, Amsterdam NL, vol. 10, No. 1-3, Jul. 1, 1997 (Jul. 1, 1997), pp. 115-141, XP004082704 ISSN: 0923-5965, pp. 123-128, paragraph 3.

Jose I Ronda et al: "Rate Control and Bit Allocation for MPEG-4" IEEE Transactions on Circuits and Systems for Video Technology, IEEE Service Center, Piscataway, NJ, US vol. 9, No. 8, Dec. 1, 1999 (Dec. 1, 1999), XP011014640 ISSN: 1051-8215, p. 1245 - p. 1250, paragraphs III, IV.

Nguyen E et al: "A ROI approach for hybrid image sequence coding" Proceedings of the International Conference on Image Processing (ICIP) Austin, Nov. 13-16, 1994: [Proceedings of the International Conference on Image Processing (ICIP)], Los Alamitos, IEEE Comp. Soc. Press, US, vol. 3, Nov. 13, 1994 (Nov. 13, 1994), pp. 245-249, XP010146426, ISBN: 978-0-8186-6952-1, pp. 246-248, paragraph 3.

Yan Yang et al: "Rate-distortion optimizations for region and object based wave video coding" Signal, Systems and Computers, 2000. Conference Record of the Thirty-Fourth Asilomar Conference on Oct. 29 - Nov. 1, 2000, Piscataway, NJ, USA, IEEE, vol. 2, Oct. 29, 2000 (Oct. 29, 2000), pp. 1363-1368, XP010535223, ISBN: 978-0-7803-6514-8, whole document.

Deshpande S et al: "HTTP streaming of JPEG2000 images" Proceedings of the International Conference on Information Technology, Las Vegas, NV, USA, April 2-4, 2001, Apr. 2, 2001 (Apr. 2, 2001), pp. 15-19, XP002193324, IEEE, USA, pp. 16-18, paragraphs 3, 4.

European Search Report issued in European counterpart application No. 06 752 191.4-2223, Filed: Mar. 5, 2006, based on International Application No. PCT/US20061017081, Filed: Mar. 5, 2006.

* cited by examiner

RATE CONTROL OF SCALABLY CODED IMAGES

BACKGROUND OF THE INVENTION

1. Field of the Invention

The invention relates to a method of rate control for scalably coded images, and more specifically to rate control that satisfies specified requirements on subsets of image data. Rate control may achieve high reconstructed image quality within the subsets subject to size requirements on the subsets or small compressed sizes of the subsets subject to quality requirements on the subsets.

2. Description of the Related Art

Over the past few decades, subband or wavelet coding has proven to be an efficient method for compression of images. Of particular importance is the new image compression standard JPEG2000, as described in ITU-T Rec. T.800/ISO/IEC 15444-1:2004 JPEG 2000 Image Coding System, which is hereby incorporated by reference. Similar to other compression standards, the JPEG2000 standard defines the decoder and the associated codestream syntax. The standard does not dictate the operations of the encoder as long as the generated codestream is compliant to the defined codestream syntax and can be decoded by a compliant decoder. This allows flexible encoder design. See "JPEG2000 Image Coding System," 2004 and D. S. Taubman and M. W. Marcellin, JPEG2000: Image Compression Fundamentals, Practice and Standards, Kluwer Academic Publishers, Boston, 2002, which is hereby incorporated by reference.

FIG. 1 illustrates a representative JPEG2000 encoder 10 used to encode an image 11. Each image is (optionally) divided into non-overlapping rectangular tiles 12. Tiles allow spatial random access and limit the implementation memory requirements. Next, an optional component transform 14 can be used to improve compression efficiency. For example, if an image consists of Red, Green, and Blue color components, applying a color transform can improve compression performance. Each (transformed) color component of a tile is then referred to as a tile-component. Application of a wavelet transform 16 to each tile-component produces a number of transform coefficients, organized into subbands for each tile-component. The transform coefficients for each subband are then partitioned into rectangular blocks referred to as codeblocks 18. Each codeblock is then encoded independently by a codeblock encoder 19.

For a given codeblock, its encoding begins by quantizing its coefficients to obtain quantization indices. These quantization indices can be regarded as an array of signed integers. When reversible wavelet transforms are employed, quantization is not strictly required, as the wavelet coefficients are already integers. This array of signed integers can be represented using a sign array and a magnitude array. The sign array can be considered as a binary array where the value of the array at each point indicates whether the quantization index is positive or negative. The magnitude array can be divided into a series of binary arrays with one bit from each quantization index. The first of these arrays corresponds to the Most Significant Bits (MSBs) of the quantization indices, and the last one corresponds to the Least Significant Bits (LSBs). Each such array is referred to as a bitplane. Each bitplane of a codeblock is then entropy coded using a bitplane coder. The bitplane coder used in JPEG2000 is a context-dependent, binary, arithmetic coder. The bitplane coder makes three passes over each bitplane of a codeblock. These passes are referred to as coding passes. Each bit in the bitplane is encoded in one of these coding passes. The resulting compressed data are referred to as compressed coding passes.

The codeblock encoder also computes the amount of distortion (mean squared error) reduction provided by each compressed coding pass together with the length of the compressed coding pass. With this information, it is possible to define the ratio of the distortion reduction over the length of the compressed coding pass as the distortion-rate slope of the compressed coding pass. The distortion-rate slope of a compressed coding pass is the amount of distortion reduction per byte provided by the compressed coding pass. Thus, a compressed coding pass with a larger distortion-rate slope can be considered to be more important than one with a smaller distortion-rate slope. The codeblock encoder 19 provides the compressed coding passes 20, their lengths 22 and distortion rate slopes 21 to a codestream generation unit 23 that decides which compressed coding passes 20 from each codeblock 18 will be included in the codestream. The codestream generation unit includes the compressed coding passes with the largest rate-distortion slopes into the codestream until the byte budget is exhausted.

JPEG2000 allows great flexibility in the formation of codestreams. For example, the standard allows grouping of the compressed data into layers. Layers are formed by grouping compressed coding passes from a tile. Thus, it is possible to create a codestream with several layers such that the truncation of the later layers in the codestream results in reconstruction of the image (or a tile) at reduced quality. Typical practice involves the creation of each layer to a given fixed byte budget.

The JPEG2000 standard was designed as a still image coding standard. The encoder operation described above defines how a single image can be encoded using JPEG2000. However, JPEG2000 can be used to encode the individual images that make up an image sequence, e.g., video or motion pictures. This can be done with or without Part 3 of the standard, which describes a file format for image sequences. Part 3 of the standard is sometimes referred to as Motion JPEG2000.

When JPEG2000 is used to compress a sequence of images, there are only a few methods currently known for determining what rate to use for each image in the sequence. One possibility is to select a fixed rate (i.e. fixed number of bytes) to encode each image in the sequence. While this method is simple and allows easy implementation, it does not yield adequate performance in some applications. In many image sequences, the characteristics of the images in the sequence vary immensely. Since this method assigns a fixed number of bytes to each image, the resulting decompressed image sequence exhibits large variations in quality among images.

This shortcoming has been identified by Tzannes et al in US Patent Application US 2004/0047511 A1. Tzannes et al enable adaptive selection of compression parameters to achieve some performance improvement when the images are encoded in succession. The adaptation is performed for the current image using information gathered from only the previous images in the sequence: subsequent images are not considered when allocating rate for the current image. Furthermore, if two consecutive images in the sequence are not highly correlated (such as the case during a scene change), the adaptation falters. Another alternative to fixed rate coding was presented by Dagher et al. in Resource-Constrained Rate Control for Motion JPEG2000, IEEE Transactions on Image Processing, December 2003. In this method, compressed images are placed in a buffer. Compressed data are pulled out of the buffer at a constant rate. New compressed images are added to the buffer when they become available. If the buffer is full when a new compressed image is to be added, the new compressed image, as well as the other images already in the buffer, are truncated so that all compressed data fit into the buffer. The resulting images have relatively low quality variation within a "sliding time window" corresponding to the length of the buffer employed. However, quality can vary widely over time-frames larger than the length of the sliding window.

Additionally, none of the methods above provide a capability to place size or quality requirements on subsets of image data, such as individual images, individual components, etc.

SUMMARY OF THE INVENTION

The present invention provides a method of rate-control for a sequence of scalably coded images that satisfies requirements applied to subsets of image data. The method may attempt to achieve high reconstructed image quality for different subsets subject to size requirements. Conversely, the method may attempt to achieve small compressed sizes for different subsets subject to quality requirements.

The method of rate control is applicable to a class of coders in which the images in the sequence are transformed to obtain transform coefficients. These coefficients are partitioned into coding units. The coefficients of each coding unit are coded to yield a plurality of quality increments. In a JPEG2000 compression system, the coding units are codeblocks and the quality increments are compressed coding passes.

Rate control is accomplished by collecting coding units into one or more subsets. Image-wise subsets are comprised of coding units from a single image. For a given image, image-wise subsets may define different resolution levels, spatial regions, tiles, color components, or any combinations thereof including the entire image. Sequence-wise subsets are comprised of codeblocks from every image in the sequence. They may define different resolution levels, spatial regions, tiles, or color components, or any combinations thereof for an entire sequence. A single sequence-wise subset may include all coding units of all images in the sequence, therefore defining the entire image sequence.

A list of requirements (LOR) is created such that each subset has at least one associated entry in the list. Requirements associated with image-wise subsets are referred to as image-wise requirements. Requirements associated with sequence-wise subsets are referred to as sequence-wise requirements.

Significance values are computed for each quality increment of each coding unit. The significance values are used to determine which coding passes to save to satisfy the requirements for the relevant subsets while attempting to achieve high reconstructed quality or low compressed sizes. A codestream that satisfies the LOR for all subsets is constructed for the sequence of images from the saved quality increments. Such a codestream is referred to as an "admissible codestream." The method of determining which quality increments to save for each coding unit and of constructing an admissible codestream will depend on issues such as the LOR, computational complexity, memory, etc.

We summarize the invention for the case of attempting to achieve high quality as allowed by specified requirements on sizes. Achieving low sizes as allowed by specified requirements on quality is similar. For each image, a one-pass approach selects the quality increments having largest significance values within each image-wise subset such that the total size of the selected quality increments satisfies the image-wise size requirements for that subset. The selected quality increments, significance values and lengths are saved. The remainder are discarded. Once all images are so processed, the remaining quality increments of each sequence-wise subset having largest significance values are selected so that the total size of the selected quality increments satisfies the sequence-wise size requirements on that subset. The selected quality increments form the admissible codestream and the remainder are discarded.

A two-pass approach is very similar to the one-pass approach except that as each image is processed only the significance values and lengths for the selected quality increments are saved. All of the quality increment data are discarded to reduce memory and/or storage requirements. Once all of the images are processed and the quality increments for the admissible codestream are determined using the saved significance values and lengths, the images are recoded and the selected quality increments are used to form the admissible codestream. During this second pass, it is possible to only generate the desired quality increments to avoid unnecessary computations.

An iterative method processes each image and selects the quality increments from each image-wise subset having largest significance values such that the total size of the selected quality increments satisfies the image-wise size requirement for that subset. Additionally, for each image the process selects the coding passes of that image belonging to each sequence-wise subset having significance values above a significance threshold for that subset. Once all images have been so processed, the method determines whether the total size of the selected quality increments across all of the images satisfies the sequence-wise size requirements for the relevant sequence-wise subsets. If not, the process iterates by varying the significance thresholds until the sequence-wise size requirements are met.

Each of the methods attempts to achieve high reconstructed image quality within the subsets as allowed by the requirements. Specifically, the methods attempt to achieve high quality within each image-wise subset of each individual image as well as high average quality (averaged over all images of the sequence) within each sequence-wise subset. A trade-off between high image-by-image quality and high average quality may occur due to the relative strictness of image-wise vs. sequence-wise size requirements. When quality increment selection is dominated by any sequence-wise size requirements, each of the methods will also achieve approximately constant reconstructed image quality from image-to-image within the relevant subsets.

These and other features and advantages of the invention will be apparent to those skilled in the art from the following detailed description of preferred embodiments, taken together with the accompanying drawings, in which:

DETAILED DESCRIPTION OF THE INVENTION

The invention relates to a method of encoding images using a class of scalable coders exemplified by JPEG2000, and more specifically to a rate control method for a sequence of scalably coded images. The rate control method determines the compressed data to be included in the admissible codestream for a sequence of images such that a predetermined set of requirements is met for predetermined subset definitions. The method attempts to achieve high reconstructed image quality within the relevant subsets, as allowed by size requirements on the subsets. For certain requirements, the method will also achieve approximately constant reconstructed image quality from image-to-image within the relevant subsets. Of course, a subset constrained to a small size will have low quality compared to if it where constrained to a larger size. Thus, "high quality" should be interpreted relative to the requirements. Alternately, the method can attempt to achieve small compressed sizes for the subsets, while satisfying specified quality requirements on the subsets.

The described methods for rate control are applicable to any sequence of digital images, including motion pictures, video, time-series data, 3-D volumetric images, (such as multi-spectral and hyper-spectral remote sensing data), or higher dimensional data sets, as well as individual still images. While the embodiments are described with respect to JPEG2000 compression, they are applicable to other compression methods with functionality similar to that of JPEG2000.

While some embodiments of this invention are described with respect to a single sequence of images, they are also applicable to cases where the sequence of images is comprised of a number of groups. As an example, such groups might be obtained by temporal partitioning of a sequence. In this case, each group might be analogous to a "reel" of film. As another example, different groups might be defined as feature presentation, trailer 1, trailer 2, pre-show ads, etc. In the case of a "3D" (stereo) image sequence there might be two groups consisting of images intended for viewing by the left and right eyes, respectively. The "left" and "right" groups might be further subdivided into reels. In each case, rate allocation might be carried out individually on each group by treating each as a sequence. On the other hand, all groups might be aggregated and treated as a single sequence for the purpose of rate allocation.

Rate Control of Scalably Coded Images

Figure 1:
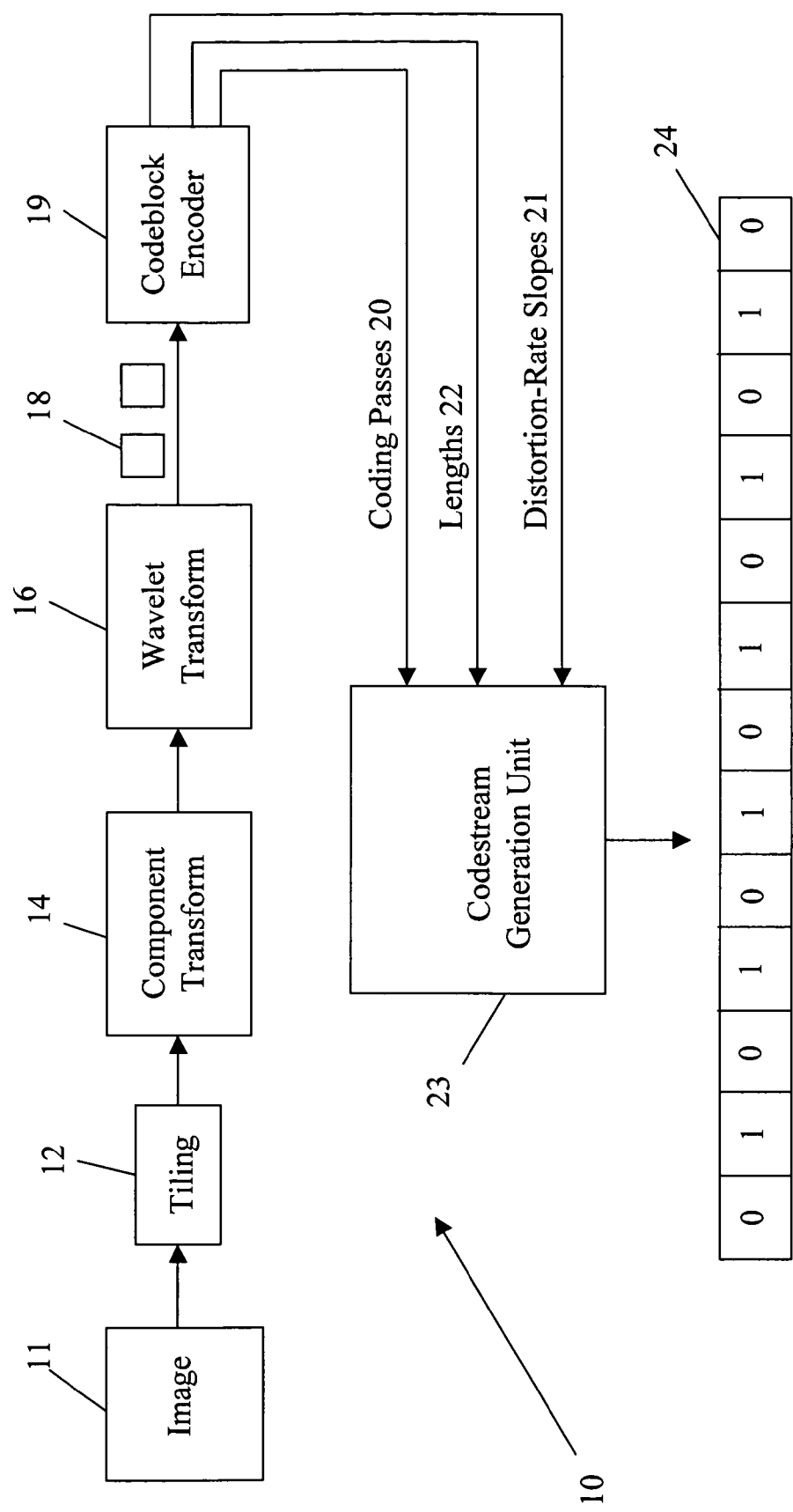
FIG. 1, as described above, is a block diagram of a representative JPEG2000 encoder.
Figure 2:
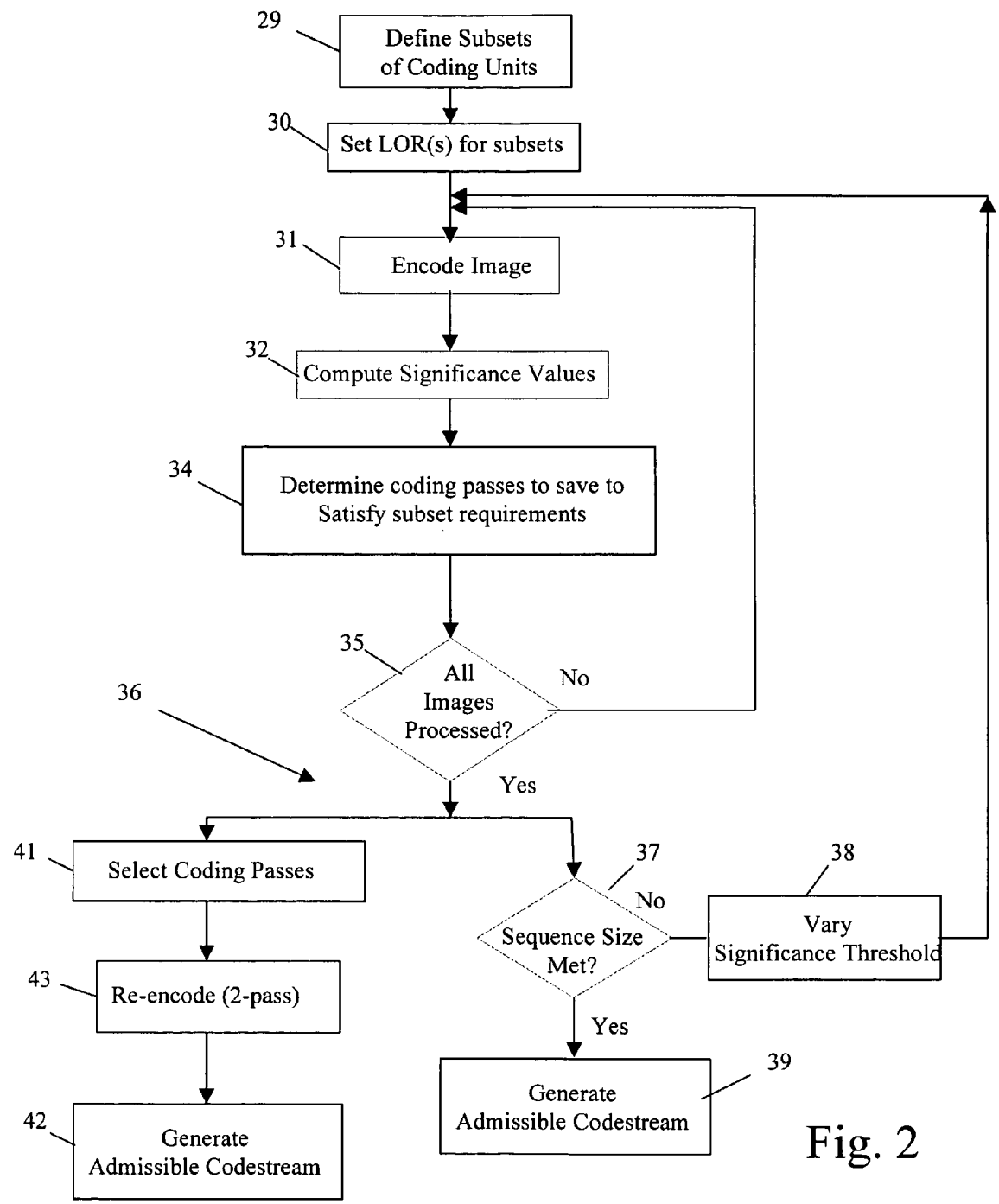
FIG. 2 is a flowchart illustrating rate allocation of a sequence of images in accordance with the present invention.

As shown in FIG. 2, rate control is accomplished by defining subsets of coding units (step 29). Preferably coding units are codeblocks in JPEG2000 but alternately, subbands, DCT blocks, transformed components, entire transformed images, or other data structures. These subsets are defined using knowledge of the coding process that will be used in step 31.

A subset defined on an individual image is referred to as an image-wise subset. These image-wise subsets may define different resolution levels e.g. 2K and 4K, different spatial regions e.g. foreground and background, different color components e.g. R, G, B, or any combinations thereof including the entire image. Other subsets are possible within the spirit and scope of the method. An image-wise subset is useful in defining requirements on an individual image. For example, in a multi-component application, compressed size requirements might be placed on each component of an image, as well as on the entire image. For a three component image the coding units of the image would then be grouped into three subsets corresponding to the three image components, say R, G, B. A forth subset would be comprised of all coding units in the image. Clearly then, image-wise subsets need not be disjoint.

A subset defined for the entire image sequence is referred to as a sequence-wise subset. Sequence-wise subsets may define different resolution levels e.g. 2K and 4K, different spatial regions e.g. foreground and background, or different color components e.g. R, G, B, or any combinations thereof including the entire sequence. Other sequence-wise subsets are possible within the spirit and scope of the method. Sequence-wise subsets are useful in defining aggregate requirements on the entire sequence. For example, in a multi-component application, requirements might be placed on the total compressed size (aggregated over all images in the sequence) of each component, as well as the aggregate compressed size of all images in the sequence. For a sequence of images each having three components, the coding units of all images in the sequence would be grouped into three subsets corresponding to R, G, B. A fourth subset would be comprised of all coding units of all images in the sequence. Clearly then, sequence-wise subsets also need not be disjoint.

Image-wise subsets of one image may differ from those of another image. For example, one image might have three subsets corresponding to R, G, B, while another image has a single subset corresponding to the entire image. Still another image might have no subsets defined. Similarly, a sequence may have no sequence-wise subsets defined. At least one image must contribute one or more coding units to two or more subsets. The one image might contribute the same coding units to the two subsets, or it might contribute different coding units to the two subsets. The two subsets might be both image-wise, or both sequence-wise, or one of each.

A list of requirements (LOR) is set for the subsets (step 30), so that each subset has at least one requirement. The LOR may typically include quality requirements (desired, min, max) and/or size requirements (desired, min, max) for each of the subsets. Other requirements are possible within the spirit and scope of the method.

Rate Control is applied to each image as well as to the sequence of images. To this end, each image is encoded using a coder such as JPEG2000 (step 31). Although the coding process will entail a number of steps that are well understood to those of ordinary skill in the art, the essential and relevant steps for the purpose of rate control are (1) transforming each image into transform coefficients using a wavelet, DCT or other suitable transform (2) separating the transform coefficients into coding units and (3) coding the coefficients of each coding unit to yield multiple quality increments for each coding unit. JPEG2000 uses a wavelet transform, separates the coefficients into codeblocks which are coded to yield compressed coding passes for each codeblock.

In JPEG2000, the coding unit coding process employs quantization followed by bitplane coding to yield quality increments. This point of view considers quantization as part of the coding unit coding process. Alternately, quantization can be considered as part of the transform process. Indeed, a particular implementation might incorporate quantization into the transform by using appropriate scaling and rounding and/or a reversible transform. Typically, quantization step-sizes are set relatively small and all of the bit-planes are coded to ensure a high base quality prior to rate allocation. Alternately, a more moderate step-size can be used to lower the number of starting bit planes that need to be coded, resulting in a lower starting quality level. Alternately, a reduced number (rather than all) of the most significant bit-planes can be encoded to achieve a similar effect. The motivation behind these alternatives is to save on complexity and/or memory/storage. However, care must be taken not to reduce the initial quality too much. Alternately, step-sizes can be chosen according to a desired quality.

Significance values for each quality increment are computed (step 32). This may be done concurrently with step 31. Suitable significance values might be distortion-rate slopes. Such slopes represent the benefit/cost ratio of including a quality increment in the codestream. Specifically, the slope for a particular quality increment is the decrease in distortion (typically MSE or some other indicator of quality) provided by the quality increment divided by the length of the quality increment (typically in bytes). Quality increments with larger distortion-rate slopes can then be considered more important than those with smaller slopes. In the above, MSE calculations might be modified to include visual weighting and/or visual masking considerations (see for example, Taubman and Marcellin, Section 16.1). Alternately, MSE might be replaced by "just noticeable differences," or other visually motivated distortion measures.

Additional choices for significance values are possible. For example, suppose that coding units of a subset each have K bitplanes numbered from K-1 to 0 (MSB to LSB). These bitplane numbers can be used as significance values. A similar effect can be obtained by using quality increment numbers (rather than bitplane numbers) as significance values. Another variation would assign a range of significance values for all quality increments having the same bitplane number. Ranges for different bitplane numbers would be distinct, and significance values within a range might be ordered according to distortion-rate slopes. For example, let b be the bitplane number of a quality increment and let s be its distortion-rate slope. Further let ms be the maximal slope. Then one choice of significance value for the quality increment might be b+s/ms.

Significance values might be weighted to emphasize or de-emphasize one or more spatial regions (possibly the whole image) of one or more images.

As evident from Section 8.2 of Taubman and Marcellin it is sometimes desirable to disallow coding unit codestream termination between certain quality increments. Equivalently, it may be desirable to "group" two or more quality increments and treat them as essentially a single composite quality increment for the purpose of rate allocation. Such a composite quality increment has a single distortion-rate slope computed as the total distortion decrease of the group of quality increments divided by the total length of the group of quality increments. To simplify discussion, it should be assumed throughout that this grouping is carried out when appropriate, and that then the term "quality increment" may refer to a composite quality increment.

The significance values are used to determine which quality increments to save as needed to satisfy certain subset requirements (step 34). Steps 31, 32 and 34 are carried out for each image in the sequence (step 35). The figure may seem to indicate sequential processing of the images, but parallel processing is also possible since there are no dependencies between images in steps 31, 32, and 34. At this point, an admissible codestream for the entire sequence is constructed subject to any remaining requirements for the relevant subsets (step 36).

In an exemplary embodiment, any image-wise requirements are satisfied in step 34 while any sequence-wise requirements are satisfied in step 36. Alternately, it is possible to save all quality increments in step 34 and postpone all decisions until step 36. This would increase the memory/storage needed, but may have advantages in certain applications such as editing and archiving.

The method of determining which quality increments to save for each encoded image (step 34) and of constructing the admissible codestream for the sequence of images (step 36) will depend on the list of requirements and any additional issues such as computational complexity, memory, additional decoder requirements, etc.

We first describe embodiments that attempt to achieve high quality as allowed by size requirements. Subsequently, we will describe embodiments that attempt to achieve low sizes as allowed by quality requirements.

One-Pass Approach

A one-pass approach selects the quality increments having largest significance values from each image-wise subset such that the total size of the selected quality increments from that subset satisfies any image-wise size requirement for that subset (step 34).

The selected quality increments, significance values and lengths are saved for each image. Non-selected quality increments are discarded. Once all of the images are so processed, the method selects the quality increments (from all images) having the largest significance values from those remaining in each sequence-wise subset such that the total size of the selected quality increments from that subset (in aggregate over all images) satisfies any sequence-wise size requirement on the subset (step 41). The selected quality increments are used to form the admissible codestream (step 42). The remainder (unselected quality increments) are discarded and the admissible codestream recorded on a media such as a drive, disk or tape or it is transmitted over a channel.

Two-Pass Approach

The one-pass approach may require the temporary storage of compressed data that are larger than ultimately needed in the admissible codestream. For some applications, this may be undesirable. A two-pass approach modifies the one-pass approach by keeping only significance values and lengths, and throwing away all quality increments as each image is encoded and then, once the admissible codestream composition has been determined (step 41), re-encoding all of the images (step 43) to generate the quality increments that are used to form the admissible codestream (step 42). During this second pass, it is possible to only generate the desired quality increments to avoid unnecessary computations and/or storage.

Iterative Approach

An iterative approach proceeds as follows: For each image, the quality increments having largest significance values from each image-wise subset are selected such that the total size of the selected quality increments from that subset satisfy any image-wise size requirement for that subset (step 34). Non-selected quality increments are discarded. Additionally, all remaining quality increments from that image belonging to each sequence wise subset having significance values above a significance threshold for that subset are selected (also step 34). Non-selected quality increments are discarded. For this latter operation, the threshold for each sequence-wise subset is held fixed until all images have been so processed. The operations of step 34 may be performed concurrently or ordered differently depending on the subset definitions. Once all images have been so processed, the method determines whether the total size of the selected quality increments satisfies the sequence-wise size requirements for the relevant sequence-wise subsets (step 37). If not, the process iterates by varying the significance thresholds for the relevant sequence-wise subsets (step 38) and returning to step 31 until the sequence-wise size requirements are met and then outputting the admissible codestream (step 39).

Increasing the significance threshold results in a smaller codestream and decreasing the significance threshold results in a larger one. Often requirements on different subsets are independent, and the searches for suitable significance thresholds can be carried out independently. In this case, a significance threshold may be varied in step 38 using a number of techniques including trial and error, bisection, gradient descent or any other 1-D numerical search technique. If the searches cannot be conducted independently, any multidimensional numerical search technique can be employed. When distortion-rate slopes are used as the significance values, they can be used to aid derivative/gradient based search methods.

Quality Increment Selection

All embodiments above employ the process of selecting quality increments having largest significance values within a subset. This process can be accomplished in many ways. One method lists quality increments in descending order of their significance values and then selects from the top of the list. In another method, only the significance values are listed in descending order, since their correspondence to quality increments is known. In another method, a significance threshold is set for a subset with the idea that all quality increments with significance values above the threshold will be selected. This can be seen as equivalent to selecting a number of quality increments from the top of an ordered list of the subset by considering FIG. 3.

Figure 3:
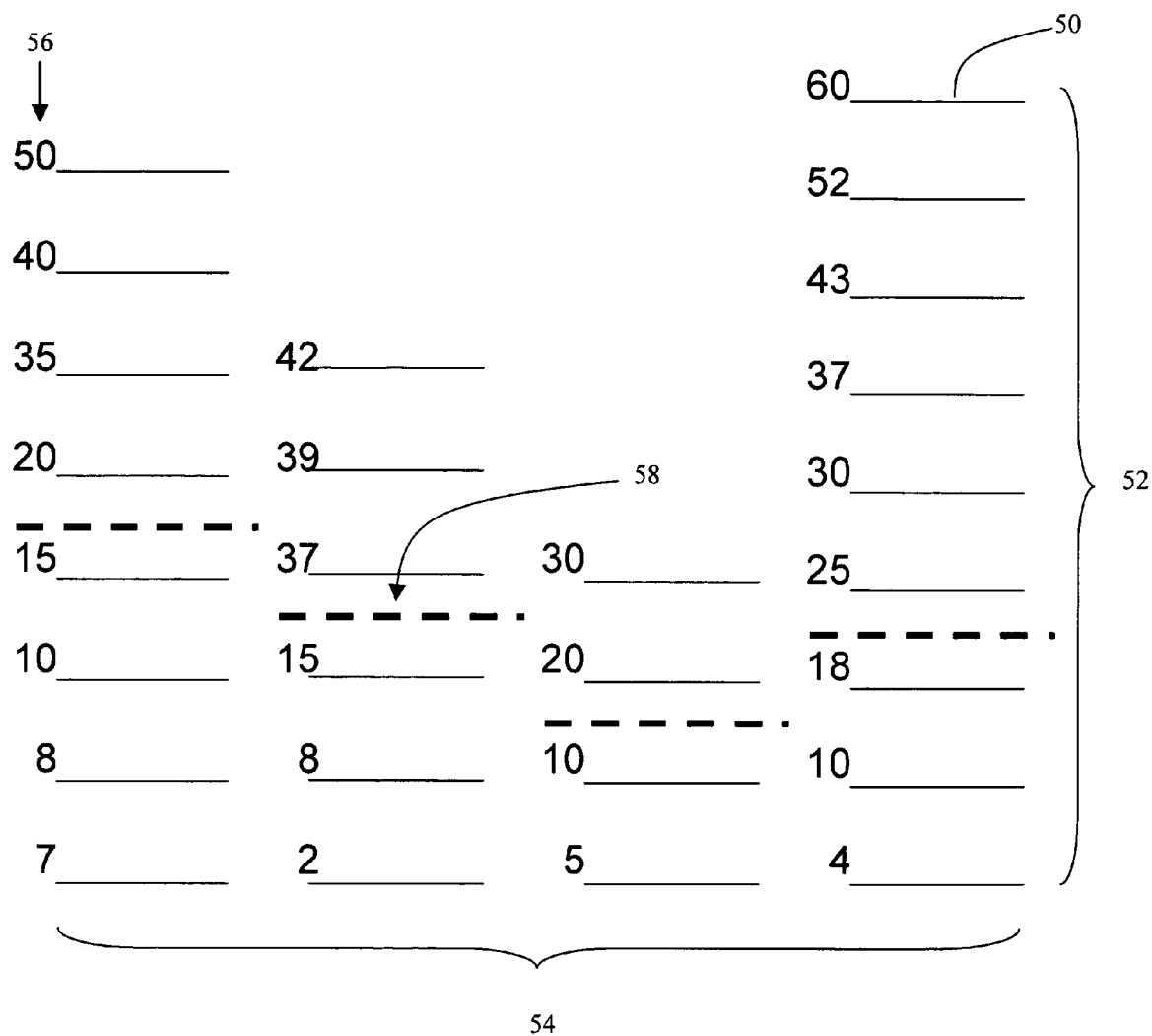
FIG. 3 illustrates selecting quality increments from a subset.

In FIG. 3 each solid horizontal line represents a quality increment 50 and each stack of horizontal lines represents a coding unit 52. The collection of coding units represents a subset 54. In the figure, significance values 56 are indicated next to each quality increment. It is clear that selecting all quality increments of each coding unit having a significance value above a threshold 58 set at nineteen, (as indicated by the dashed horizontal lines) is equivalent to sorting all quality increments in the subset and then selecting fifteen quality increments from the top of the list. If the total length of the quality increments thus selected is not as desired, the threshold can be adjusted and the process repeated until the total length is as desired (within some tolerance). This is similar to the iterative rate control process described above, but no recoding of data is required in this case. The iteration is carried out within step 34 or step 41 using significance values and lengths previously computed. This approach can have computational and memory advantages over actually sorting and listing significance values or quality increments. Increasing the significance threshold results in a smaller total size of selected quality increments and decreasing the significance threshold results in a larger one. The significance threshold may be varied within step 34 and/or step 41 using a number of techniques including trial and error, bisection, gradient descent or any other 1-D numerical search technique. Rather than iterating it is also possible to test multiple thresholds in parallel.

Parallel Processing

As mentioned previously, it is possible to carry out steps 31, 32, and 34 in parallel for multiple images. It is also possible to carry out much of the work in steps 41 and/or 42 in a parallel fashion. Assume each processor has the quality increments, significance values, and sizes for one or more images. A control processor can broadcast a significance threshold for each subset to all processors. Each processor can return the total size for each subset of its images corresponding to the broadcast thresholds. The control processor can sum these sizes and broadcast new thresholds, iterating until the desired total sizes (sums) are achieved. The control can then request each processor to create and output the admissible codestream for its images from the quality increments having significance values above the final thresholds.

High Quality

Each approach attempts to achieve high reconstructed image quality within the relevant subsets (as feasible within the requirements of the LOR). Specifically, the embodiments attempt to achieve high quality for individual images in step 34. The embodiments attempt to achieve high average quality for the entire sequence in step 36. In each of steps 34 and 36, the embodiments attempt to achieve high quality by including quality increments having the largest significance values. In some cases, the embodiments will achieve roughly constant quality image-to-image within the relevant subsets. From the section above entitled "Quality Increment Selection," the one-pass two-pass and iterative methods can be seen to satisfy any sequence-wise requirement for a given sequence-wise subset by (something equivalent to) setting a threshold for that subset and including (from all images) all quality increments within the subset having significance values above that threshold.

Thus, the admissible codestream then contains all quality increments of all images within the sequence-wise subset having significance values above a significance threshold less those discarded due to any relevant image-wise requirement in step 34. Thus, if no image-wise requirement is in effect, the quality will be (roughly) constant within the sequence-wise subset from image-to-image. When both sequence-wise and image-wise requirements are in effect, significant quality deviations may occur when a particular image is very difficult to encode as compared to others in the sequence. For such an image, quality increments are discarded according to any image-wise requirement and quality may fall for that image. The ability to achieve constant quality is thus governed by the relative strictness of sequence-wise vs. image-wise requirements. In particular, this ability is reduced when image-wise requirements are stringent as compared to sequence-wise requirements. In the extreme, if no sequence-wise requirement is in effect, the desired sequence-wise size can be considered to be "as large as possible." In this case, the image-wise requirement comes into play on every image and quality will vary widely.

It should also be noted that when an image is extremely easy to code compared to others in the sequence, quality may be significantly higher than that of the other images, even though its compressed size might be very low.

Small Size

The one-pass, two-pass, and iterative embodiments as described above attempt to achieve high quality as allowed by size requirements in the LOR. Conversely, alternate embodiments attempt to achieve small sizes as allowed by quality (distortion) requirements in the LOR. If an image-wise quality requirement exists for a subset, step 34 selects quality increments from the subset having largest significance values so that any quality requirements are satisfied for the subset. If a sequence-wise quality requirement exists for a sequence-wise subset, we need to consider the one-pass and two-pass methods separately from the iterative method. For the one-pass and two-pass methods, step 41 selects quality increments from the sequence-wise subset over all images so that the average quality of the subset (averaged over all images) meets the quality requirement. For the iterative method, step 38 varies the threshold until the average quality meets the quality requirement.

It is worth noting that when satisfying a quality requirement, the distortion decreases associated with each quality increment might be useful in this regard (rather than the quality increment lengths). It is also worth noting that requirement types might be mixed. For example, a size requirement and a quality requirement might both be present in the LOR for a single sequence.

Using Layers to Reduce Memory/Storage

The layering mechanism provided by JPEG2000 may be incorporated in the one-pass or two-pass embodiments to save memory/storage used to store significance values and lengths, or to simplify certain implementations. In this embodiment, the quality increments are grouped to form two or more layers. The quality increments that are more significant are placed in earlier layers, and the quality increments that are less significant are placed in later layers. The layers can be formed such that each layer has a desired size. Alternatively, the layers can be formed such that each layer corresponds to a given significance threshold, e.g. constant quality. In the one-pass embodiment, the quality increments are also saved. In the two-pass embodiment, the quality increments are discarded. Layers are then selected for each subset to satisfy the subset requirements. It is possible to combine or split the selected layers into new layers to achieve the desired layering structure in the admissible codestream.

Layers to Satisfy Multiple LOR

In many cases it will be possible to create one codestream containing multiple embedded codestreams, each serving a different purpose. For example, a very high quality file may comprise an archival version of a sequence of images. From this file, it may be possible to extract one or more different codestreams each for a different application. For example, one version might be for high resolution cinema distribution, while another version might be for lower resolution television distribution. This can be accomplished without any "rate allocation" at the time of extraction. The rate allocation could be done apriori. The extraction merely requires accessing the appropriate JPEG2000 data. As other examples, it is possible for different versions to correspond to different compressed sizes, foreground/background, etc., or combinations thereof.

This functionality may be achieved by creating a codestream having two or more layers. Subsets are defined and a LOR set for at least one of the two or more layers. The methods of rate allocation taught herein may be used to satisfy the LOR for each such layer. It is worth noting that the subsets need not be identical for each such layer. The subsets and LOR can be set differently for each layer according to the goals of that layer.

In some cases, it may be desirable to split a codestream having multiple layers into multiple files, each file containing data for one or more layers. For example, in the case of two layers, it may be useful to have the data for the first and second layers in separate files. This makes it easy to load only the first layer on a storage device (e.g. server) having limited size or speed, while loading both layers on a storage device having higher size and/or speed. A similar discussion holds for multiple resolutions.

RATE CONTROL EXAMPLES

The following examples illustrate different combinations of image-wise and sequence-wise subsets and requirements using both the iterative and one-pass algorithms. The two-pass algorithm is not described but may be applied to any of the examples with the above described modifications. Similarly, only size requirements are described in the examples, but quality requirements may be satisfied using the above described modifications.

Additionally the following examples address only the size of quality increment data for ease of discussion. In practice, it is desirable to take into account the size of necessary overhead information such as main headers, tile/tile-part headers and packet headers. This can generally be accomplished by appropriately decreasing the bit budget for quality increment data.

Finally, it should be noted that the examples do not address detailed construction of JPEG2000 codestreams from the selected quality increments. The selected quality increments can generally be organized in any fashion allowed by JPEG2000 including any progression order, etc.

Example 1

Single-Resolution, Single-Component

Consider the case in which the quality of the reconstructed images is to be maximized while minimizing interimage variation subject to the requirement that no single image codestream shall exceed a certain size and that the entire sequence codestream shall not exceed a certain total size.

Let subset $A_1(l)$ be the set of all coding units of image l and let $S(A_1(l))$ be the total size of all quality increments in $A_1(l)$. Similarly, let $$A_1 = \bigcup_{l=1}^{L} A_1(l)$$

be the set of all coding units of all L images, with quality increments having total size $S(A_1)$.

The subsets are,

Image-wise: $A_1(l)$, l=1, ..., L
Sequence-wise: $A_1$

The List of Requirements (LOR) is,

Image-wise: $S(A_1(l)) \leq S_1^I$=max image size for each l
Sequence-wise: $S(A_1) \leq S_1^S$=max sequence size.

Note that there are then L image-wise subsets (one for each image) each having one image-wise requirement. Additionally there is one sequence-wise subset having one sequence-wise requirement.

For the iterative algorithm, quality increments having the largest significance values are selected from $A_1(l)$ so that $S(A_1(l)) \leq S_1^S$. To achieve high quality, it is desirable for $S(A_1(l))$ to be large, i.e., close to $S_1^I$ without going over. All other quality increments are discarded. Additionally, all quality increments from image l remaining in $A_1$ (equivalently, all quality increments remaining in $A_1(l)$) and having significance values larger than an initial significance threshold are selected and the others are discarded. Once all the images are processed in this way, $S(A_1)$ is compared to $S_1^S$. If $S(A_1) \leq S_1^S$ and is within an acceptable tolerance of equality, the codestream is formed and output. Note that making $S(A_1)$ close to $S_1^S$ without going over attempts to yield high quality. If $S(A_1)$ is not as desired, the significance threshold is modified and the images are recoded. Specifically, if the size is too big, the significance threshold is increased so that fewer quality increments are retained and the size of the codestream is reduced. Conversely, if the size is too small, the significance threshold is reduced, so that additional quality increments are retained and the size of the codestream is increased.

For the one-pass algorithm, quality increments with the largest significance values are selected from $A_1(l)$ so that their total size $S(A_1(l)) \leq S_1^I$. All other quality increments in $A_1(l)$ are discarded. Once all images have been processed in this manner, quality increments with the largest significance values are selected from those remaining in $A_1$ so that the size of the codestream for all images satisfies $S(A_1) \leq S_1^S$. The selected quality increments are then used to form the admissible codestream. Any others are discarded.

Figure 4A:
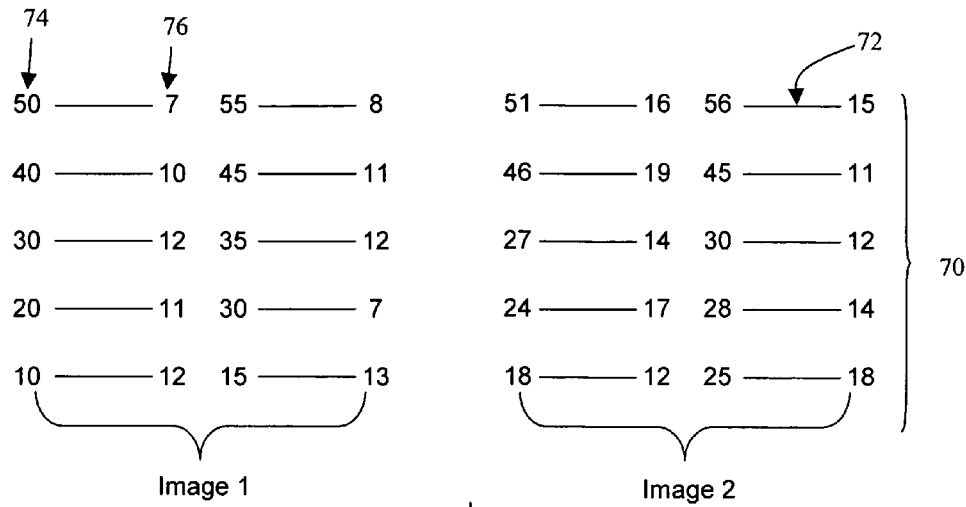
FIGS. 4a through 4c illustrate the one-pass approach for an example rate allocation problem.
Figure 4B:
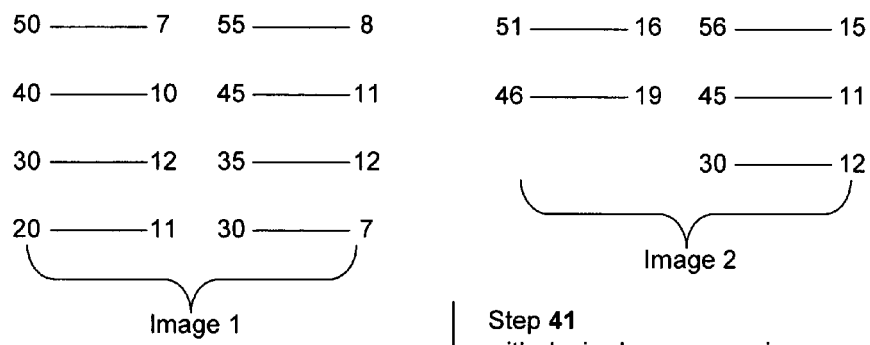
Figure 4C:
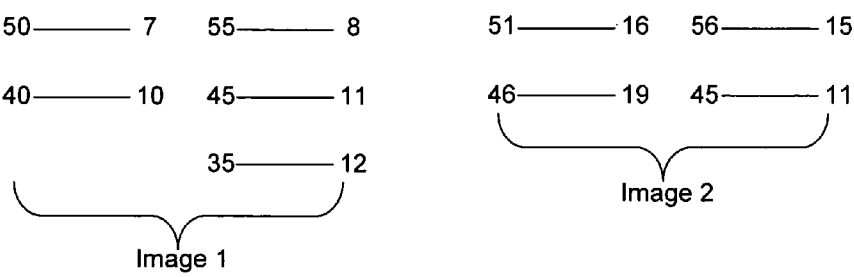

The one-pass embodiment for Example 1 is illustrated in FIGS. 4a-4c, for $S_1^I=80$ and $S_1^S=110$. FIG. 4a portrays two images, each with two coding units 70. The quality increments 72 of each coding unit are represented by horizontal lines. The significance values 74 are listed to the left of each quality increment. Their lengths 76 are listed to their right. In Example 1, the subset $A_1(l)$ is the entire image. Thus, in step 34 we choose the quality increments 72 from each image individually so that the total length of each image does not exceed the allowed max of $S_1^I=80$. This results in FIG. 4b with image 1 having length 78, and image 2 having length 73.

In step 41, we choose the quality increments 72 from the union of both images in FIG. 4b having largest significance values so that the total sequence length is less than or equal to $S_1^S=110$. This yields FIG. 4c with a total sequence length of 109.

If the sequence-wise inequality requirement were replaced by an equality requirement (within a tolerance) the method would be identical, except that it would be permissible to allow $S(A_1)$ to go somewhat above $S_1^S$ in step 41. If exact equality is desired, the inequality requirement might be used, followed by padding to the exact desired length. From this discussion those skilled in the art will be readily able to satisfy sequence-wise equality or inequality requirements for other embodiments.

Example 2

Adding Layers to Example 1

Consider the extension of Example 1 to multiple layers. In addition to the LOR of Example 1, consider adding a second list of requirements, Image-wise: $S_2(A_1(l)) \leq S_2^I$ Sequence-wise: $S_2(A_1) \leq S_2^S$ within a tolerance In this case, the subset definitions are the same for both layers and are not repeated here.

In this example $S_2^I > S_1^I$ and $S_2^S > S_1^S$. Each image codestream is then organized with two quality layers. The sizes of the data in the first quality layer $S(A_1(l))$ and $S(A_1)$ must satisfy the first set of requirements. The size of the data in the two layers together $S_2(A_1(l))$ and $S_2(A_1)$ must satisfy the second set of requirements. Alternately, the size requirements of the second layer subsets could be specified separately from those of the first layer as $S_2^I - S_1^I$ and $S_2^S - S_1^S$.

There are many ways to do the rate allocation using the present invention. A one-pass method considers only $S_2(A_1(l))$ in step 34 and selects quality increments from $A_1(l)$ having largest significance values so that $S_2(A_1(l)) \leq S_2^I$. Non-selected quality increments are discarded. Then in step 41, quality increments are selected from $A_1$ having largest significance values so that $S_2(A_1) \leq S_2^S$. Non-selected quality increments are discarded. All selected quality increments go into the admissible codestream. Some quality increments go into layer 1 with all other quality increments going into layer 2. The quality increments for layer 1 are selected as follows. For each image, quality increments are selected from those remaining in $A_1(l)$ having largest significance values so that $S(A_1(l)) \leq S_1^I$. Then, from those so selected (aggregate over all images), select those with largest significance values so that $S(A_1) \leq S_1^S$. Those so selected go into layer 1. All others go into layer 2.

Example 3

Multi-Resolution, Single-Component

Consider a scenario where the decoded images are to be displayed at two different resolutions. One such application could be Digital Cinema, in which different movie theaters or different screens in the same theater may have projectors with different display resolutions. It would be advantageous to create a single codestream that can be used easily in both low resolution and high resolution theaters. The low resolution theater would extract the data from the codestream that enables a low resolution representation of the image. The high resolution theater would use both the low resolution data and the enhancement data that enable a high resolution representation of the image. The described methods for rate control are especially advantageous in creating such codestreams because they allow different requirements to be associated with different resolution levels.

Figure 5:
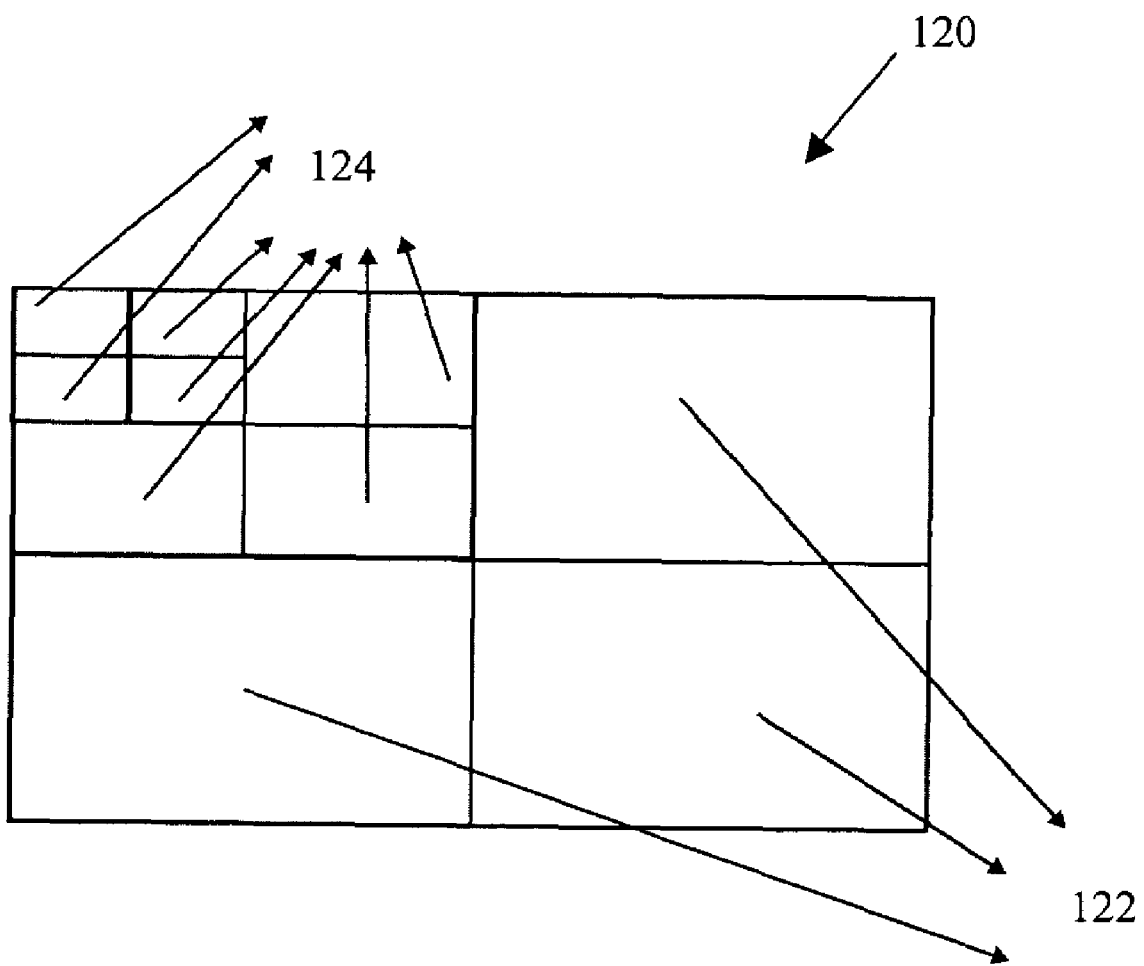
FIG. 5 illustrates wavelet subbands that contribute to different resolutions.

To illustrate this more clearly, consider the following example in which digital images of size 4096×2160 (4K) need to be compressed. Furthermore, it is also desired that images of size 2048×1080 (2K) can be extracted from the compressed codestream. Assume that there are two requirements on the codestream, the total sequence-wise size of the codestream should be a specified size and the total sequence-wise size of the compressed data required to reconstruct the images at 2K resolution should equal a different (smaller) specified size Assume that there are L images in the sequence. To generate such a codestream using JPEG2000 or a similar coder, first consider the wavelet transform 120 of a 4K image as illustrated in FIG. 5. In the figure, only subbands 124 are needed to decode the 2K image. The remaining subbands 122 are required (together with subbands 124) to decode the 4K image. Accordingly, let $A_1(l)$ be the set of all coding units from image l that originate from subbands 124 in FIG. 5. Similarly, $A_2(l)$ is the set of all coding units that originate from the subbands 122 in FIG. 5. In other words, the coding units in $A_2(l)$ contribute only to the 4K image whereas the coding units in $A_1(l)$ contribute to both the 2K and the 4K images. Clearly, $A_3(l) = A_1(l) \cup A_2(l)$ contains all coding units from image l. Let $$A_1 = \bigcup_{l=1}^{L} A_1(l),$$

-continued $$A_2 = \bigcup_{l=1}^{L} A_2(l) \text{ and}$$

$$A_3 = \bigcup_{l=1}^{L} A_3(l).$$

Clearly, $A_3$ contains all coding units from all images in the sequence. Finally, let $S(A_1)$, $S(A_2)$ and $S(A_3)$ represent the total size of compressed quality increments in $A_1$, $A_2$ and $A_3$, respectively.

The subsets are,
Image-wise: none
Sequence-wise: $A_1$ and $A_2$

All other sets defined above are for notational convenience only.

The list of requirements is,
Image-wise: none
Sequence-wise: $S(A_1)=S_1^S$, and $$S(A_2)=S_2^S=S_3^S-S_1^S$$

within some tolerances, where $S_1^S$ is the sequence-wise desired size for the 2K portion of the entire codestream and $S_3^S$ is the sequence-wise desired size for the entire codestream. In this case, there are two sequence-wise subsets each having one sequence-wise requirement.

For the iterative algorithm, the quality increments of image l from $A_1$ and $A_2$ (i.e., the coding passes in $A_1(l)$ and $A_2(l)$) having significance values above initial significance thresholds $T_1$ and $T_2$ are selected and the others are discarded. Once all the images have been so processed $S(A_1)$ and $S(A_2)$ are compared to the desired sizes $S_1^S$ and $S_2^S$. If the requirements are satisfied within an acceptable tolerance, the codestream is output. If not, the significance thresholds are modified and the images are recompressed. Specifically, if a size is too big, the relevant significance threshold is increased so that fewer quality increments are retained and the size of the codestream is reduced. Conversely, if the size is too small, the significance threshold is reduced, so that additional quality increments are retained and the size of the codestream is increased. The two thresholds can be adjusted independently in this case because $T_1$ influences only $S(A_1)$ while $T_2$ influences only $S(A_2)$.

The one-pass algorithm selects and saves all quality increments together with their significance values and their lengths (step 34). Once all images have been so processed, the significance values and the lengths of all quality increments from all images are used to select the quality increments that will be included in the admissible codestream. One approach is to separately select quality increments of $A_1$ and $A_2$ having largest significance values such that the total size of the selected $A_1$ quality increments is equal to $S_1^S$ (or is within a certain limit) and the total size of the selected $A_2$ quality increments is equal to $S_2^S$ (or is within a certain limit) (step 41). Another approach first selects quality increments from $A_1$ having largest significance values so that $S(A_1)=S_1^S$ within a tolerance, then selects quality increments from $A_2$ having largest significance values so that $S(A_2)=S_3^S-S(A_1)$ within a tolerance (also step 41). In either approach the unselected quality increments are discarded. The selected $A_1$ and $A_2$ quality increments are used to form the admissible codestream (step 42).

While the extension to layers was described only for Examples 1 and 3, those skilled in the art will easily be able to practice this extension in other cases. The approach may also be extended to three or more layers.

Example 4

Optimized Multi-Resolution

The previous example illustrated how rate control can be used to create a codestream that has different requirements on compressed data associated with different resolutions. In that example, the requirements were such that the compressed data originating from subbands 124 in FIG. 5 are limited to $S_1^S$ bytes. The remaining $S_2^S=S_3^S-S_1^S$ bytes are spent on subbands 122 that provide high frequency information for reconstructing the 4K image. While this method is easy to implement, the resulting rate allocation is not necessarily optimal when the images are reconstructed at high (4K) resolution and $S_3^S$ is suitably larger than $S_1^S$. In many cases the remaining $S_2^S$ bytes should be divided between subbands 122 and subbands 124. Specifically a portion of the remaining $S_2^S$ bytes are allocated to an additional increment for subbands 124. A 2K decoder may use the $S_1^S$ bytes, while a 4K decoder may use all $S_3^S$ bytes.

All notation is as defined in the previous example. The codestream can then be constructed in two layers. The entire codestream (first and second layers together) can be constrained to $S_3^S$ bytes, while the 2K portion of the first layer can be constrained to $S_1^S$ bytes.

The subsets for this example are,
Image-wise: none
Sequence-wise: $A_1$, $A_3$
The first list of requirements is,
Image-wise: none
Sequence-wise: $S_1(A_1)=S_1^S$, and
$S_1(A_3)=S_4^S$ (within tolerances)
The second list of requirements is,
Image-wise: none
Sequence-wise: $S_2(A_3)=S_3^S$ (within a tolerance)

where $S_1^S$ is the sequence-wise desired size for the 2K portion of the first layer and $S_3^S$ is the sequence-wise desired size for the entire codestream (first and second layers together). $S_4^S$ can be any desired value so long as $S_1^S \leq S_4^S \leq S_3^S$. One reasonable choice is $S_4^S=S_1^S$. Then the first layer is exactly the 2K portion of the codestream as limited by $S_1^S$. The embodiments below are described for this choice. Modifications for other choices are straightforward.

In an iterative method of rate control for this example two significance thresholds, $T_1$ and $T_3$, are selected before encoding starts. Typically, $T_1 > T_3$. Each image is encoded and the significance values for each quality increment are computed. The quality increments in $A_3(l)$ that have significance values less than $T_3$ are discarded. Of the remaining quality increments, those that are in $A_1(l)$ and have significance values greater than $T_1$ are selected to be placed in the first layer. The rest of the quality increments are placed in the second layer.

After all images have been so processed, $S_1(A_1)$ and $S_2(A_3)$ are compared to their desired values. If they are not within tolerance, the significance thresholds can be modified and the process repeated until the size requirements are satisfied. As before the thresholds can be modified independently because $T_1$ and $T_3$ affect $S_1(A_1)$ and $S_2(A_3)$ independently, provided $T_1 > T_3$. The same methods discussed previously for modifying thresholds may be employed here.

The one-pass algorithm selects and saves all quality increments with their significance values and lengths (step 34). Once this is done for all images, quality increments are selected from $A_3$ having largest significance values such that the total size of the selected quality increments is equal to $S_3^S$ within a tolerance (step 41). These quality increments are used to form the admissible codestream. Those not selected are discarded. Of the quality increments selected some go into the first layer with the remainder going to the second layer. The quality increments for the first layer are determined by selecting the quality increments remaining in $A_1$ having largest significance values so that the total size of the selected quality increments is $S_1^S$ within a tolerance.

Example 5

Multi-Component

Consider an example where each image in the sequence has Red, Green, and Blue color components.

Let R(l), G(l) and B(l) denote the sets of coding units for the red, green and blue components of image l respectively. Let $$R = \bigcup_{l=1}^{L} R(l),$$

$$G = \bigcup_{l=1}^{L} G(l) \text{ and}$$

$$B = \bigcup_{l=1}^{L} B(l).$$

Also let $$A(l) = R(l) \cup G(l) \cup B(l) \text{ and } A = R \cup G \cup B = \bigcup_{l=1}^{L} A(l).$$

The subsets for this example are,

Image-wise: A(l), R(l), G(l), B(l) l=1, . . . , L

Sequence-wise: A

All other sets above are for notational convenience only.

The list of requirements is,

Image-wise: $S(A(l)) \leq S_A^I$, $S(R(l)) \leq S_R^I$, $S(G(l)) \leq S_G^I$, $S(B(l)) \leq S_B^I$ Sequence-wise: $S(A) = S_A^S$ (within a tolerance)

where $S_A^I$ is the maximum total size of any image, $S_R^I$, $S_G^I$ and $S_B^I$ are the maximum total size of the R, G and B components of any image, and $S_A^S$ is the desired total sequence-wise size of the entire compressed codestream. In addition to the total size requirement, the individual images and/or components of each image should not require an excessive number of bytes. These requirements may be useful for avoiding buffer overflow/underflow or limiting the amount of computations performed for decompression of each image and/or component at the decoder. The example is intended to cover the case when one or more image-wise subsets and their size requirements are omitted. The method also covers the case when the sequence-wise subset and its size requirement are omitted. Modifications to support these omissions are included in the description below. The method is applicable to other color spaces, such as XYZ. It is also applicable when a color transform is employed. In this case, the requirements apply to the (color) transformed components.

Using the iterative approach, quality increments are selected from those in R(l) having largest significance values such that the total size of the selected quality increments is less than or equal to $S_R^I$ (step 34). The unselected quality increments in R(l) are discarded. The same operation is performed for G(l) and B(l). Quality increments are selected from those remaining in A(l) having largest significance values such that the total size of the selected quality increments is less than or equal to $S_A^I$ (step 34). The unselected quality increments are discarded. If the requirement $A(l) \leq S_A^I$ is not present, this portion of step 34 is omitted. Similar statements apply if there are no R(l), G(l), and/or B(l) image-wise requirements. Additionally, the quality increments from image l that remain in A (equivalently those that remain in A(l)) having significance values above an initial significance threshold TA are selected (step 34). Non-selected quality increments are discarded. If there is no sequence-wise requirement, this portion of step 34 can be omitted. Other orderings of the selections above are possible. Once the process has been completed for all images in the sequence, the significance threshold $T_A$ is modified (step 38) and the process repeated until the total size of the codestream S(A) is equal to $S_A^S$ within a tolerance (step 37). If the requirement $S(A) \leq S_A^S$ is not present, steps 38 and 37 are omitted.

In the one-pass approach, quality increments are selected from R(l) having largest significance values so that $S(R(l)) \leq S_R^I$. The unselected quality increments from R(l) are discarded (step 34). This process is also carried out for G(l) and B(l). Quality increments are selected from those remaining in A(l) having largest significance values such that the total size of the selected quality increments S(A(l)) is less than or equal to $S_A^I$ (step 34). Non-selected quality increments are discarded. Other orderings for the selections above are possible. When one or more of the requirements on R(l), G(l), B(l), and A(l) are not present the relevant portion of step 34 is omitted. Once this process has been completed for all images in the sequence, quality increments are selected from A having largest significance values so that $S(A) = S_A^S$ within a tolerance (step 41). If the sequence-wise requirement is not present step 41 can be omitted.

When there is no sequence-wise requirement, it is possible to replace $S(A(l)) \leq S_A^I$ with $S(A(l)) = S_A^I$ (within a tolerance). The embodiment above is changed only in that S(A(l)) might be allowed to go somewhat over $S_A^I$ in step 34. If exact equality is desired, the inequality requirement might be used followed by padding. If there is no sequence-wise requirement and no requirements on S(A(l)) it is possible to place equality requirements on R(l), G(l), and B(l). Again, the embodiment is almost unchanged. From this discussion those skilled in the art will be able to satisfy image-wise equality and inequality requirements for other embodiments.

Example 6

Multi-Resolution, Multi-Component

Figure 6:
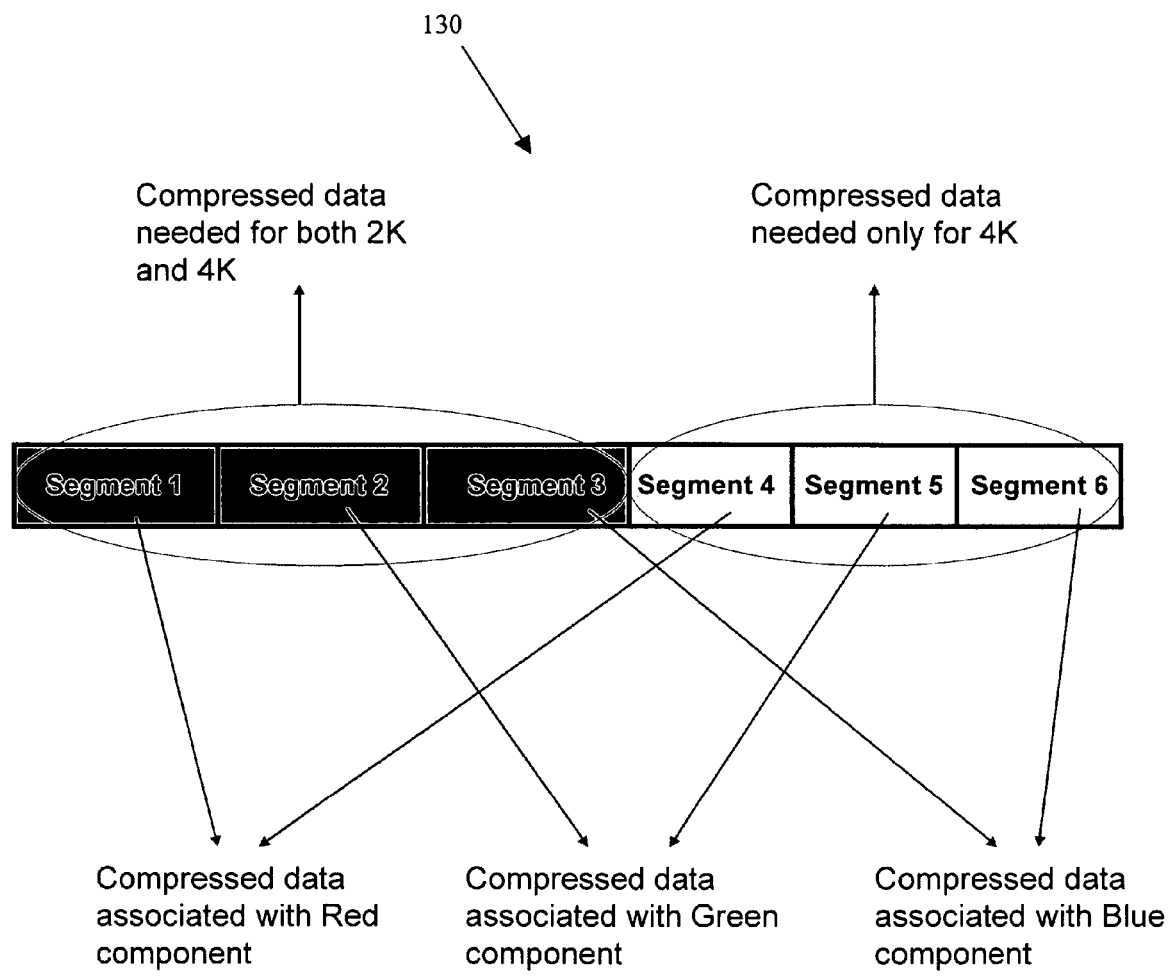
FIG. 6 illustrates an exemplary codestream organization when multiple image components exist.
Figure 7:
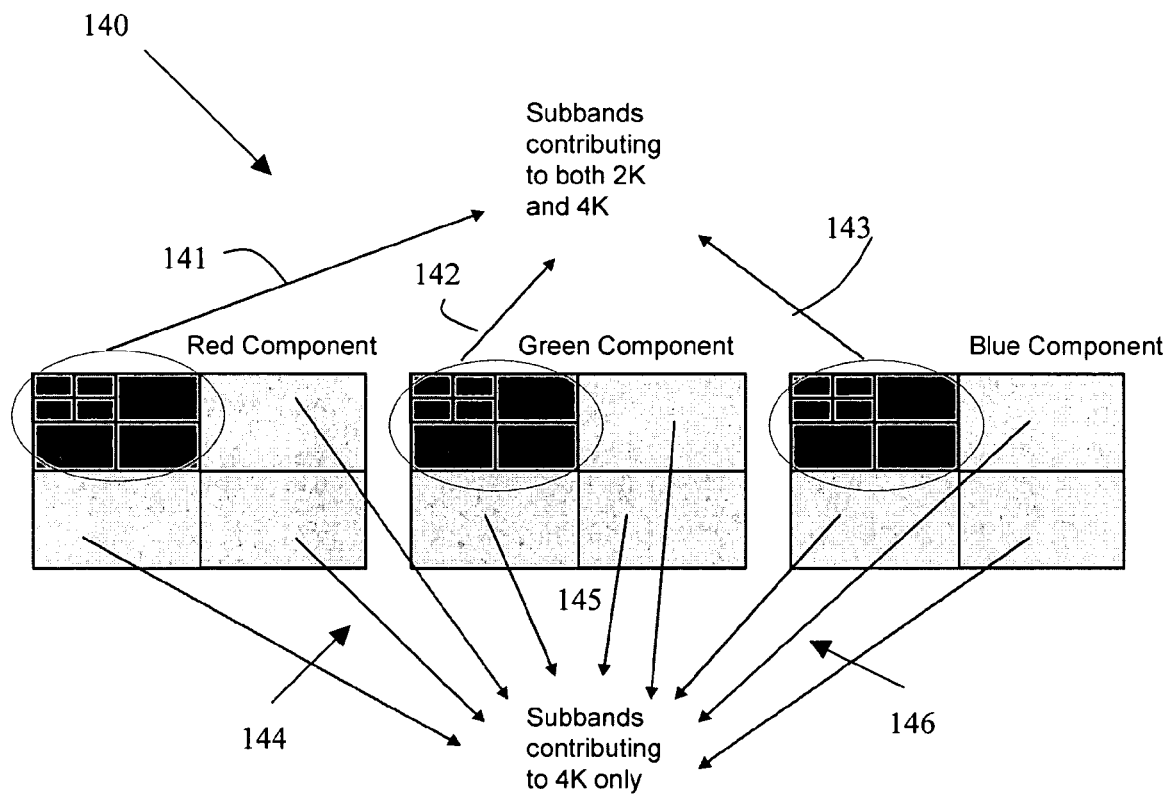
FIG. 7 illustrates wavelet subbands that contribute to different resolutions for a multiple component image.

Consider an example where each image in the sequence has Red, Green, and Blue color components, and the codestream is formed to allow display of decoded images at two different resolutions, e.g. 2K and 4K. An exemplary codestream organization 130 for this scenario is illustrated in FIG. 6 and the corresponding subband decomposition 140 is illustrated in FIG. 7. In FIG. 6, the codestream is segmented into six segments. Segments 1 and 4 contain compressed data from the Red component, segments 2 and 5 contain compressed data from the Green component, and segments 3 and 6 contain compressed data from the Blue component. The first three segments allow reconstruction of the image at 2K resolution. The last three segments allow reconstruction of the image at 4K resolution when used in conjunction with the first three segments. The codestream organization is for illustrative purposes. The compressed data obtained from the algorithm could subsequently be arranged as any valid JPEG2000 codestream.

Let $R_1(l)$, $G_1(l)$ and $B_1(l)$ denote the sets of coding units for the red, green and blue components, respectively, that correspond to subbands 141, 142, and 143, respectively, that contribute to the reconstruction of the image at both the 2K and 4K resolutions. Let $R_2(l)$, $G_2(l)$ and $B_2(l)$ denote the sets of coding units for the red, green and blue components, respectively, that correspond to subbands 144, 145 and 146, respectively, that contribute to the reconstruction of the image at the 4K resolution only. Let $R_3(l)=R_1(l)\cup R_2(l)$, $G_3(l)=G_1(l)\cup G_2(l)$ and $B_3(l)=B_1(l)\cup B_2(l)$ denote the sets of all coding units for the red, green and blue components, respectively, in an image. Let $A_1(l)=R_1(l)\cup G_1(l)\cup B_1(l)$, $A_2(l)=R_2(l)\cup G_2(l)\cup B_2(l)$ and $A_3(l)=R_3(l)\cup G_3(l)\cup B_3(l)$ denote the sets of all coding units that contribute to both 2K and 4K, 4K only and full 4K, respectively, in an image. Let $R_1=\cup R_1(l)$, $G_1=\cup G_1(l)$ and $B_1=\cup B_1(l)$ denote the sets of all coding units for the red, green and blue components, respectively, that contribute to both 2K and 4K resolution for the entire sequence. Let $R_2=\cup R_2(l)$, $G_2=\cup G_2(l)$ and $B_2=\cup B_2(l)$ denote the sets of all coding units for the red, green and blue components, respectively, that contribute to 4K resolution only for the entire sequence. Let $R_3=\cup R_3(l)$, $G_3=\cup G_3(l)$ and $B_3=\cup B_3(l)$ denote the sets of all coding units for the red, green and blue components, respectively, that contribute to full 4K resolution for the entire sequence. Let $A_1=\cup A_1(l)$, $A_2=\cup A_2(l)$, $A_3=\cup A_3(l)$ denote the sets of all coding units that contribute to both 2K and 4K, 4K only and full 4K, respectively, for the entire sequence.

The subsets for this example are,

Image-wise: $R_1(l)$, $G_1(l)$, $B_1(l)$, $A_3(l)$

Sequence-Wise: $A_3$

All others sets above are for notational convenience only

The list of requirements is,

Image-wise:

$S(R_1(l)) \leq S_{R1}{}^l$, $S(G_1(l)) \leq S_{G1}{}^l$, $S(B_1(l)) \leq S_{B1}{}^l$ (total size R, G, B 2K) $S(A_3(l)) \leq S_{A3}{}^l$ (total size full 4K)

Sequence-wise:

$S(A_3)=S_{A3}{}^S$ (total size full 4K) within a tolerance

In addition to the total sequence-wise size requirement at full 4K, the individual images, and the 2K portion of individual color components should not require an excessive number of bytes. These requirements may be useful for avoiding buffer overflow/underflow or limiting the amount of computations performed for decompression at the decoder. The method is applicable to other color spaces, such as XYZ. It is also applicable when a color transform is employed. In this case, the requirements apply to (the color) transformed components. Finally, the method is applicable when one or more of the image-wise requirements are not present. In this case, the relevant portions of step 34 can be skipped. Similarly, the algorithm is also applicable when the sequence-wise requirement is not present. In this case the relevant portions of steps 34, 41, 37 and/or 38 can be skipped.

In the one-pass approach, quality increments are selected from $R_1(l)$ having largest significance values such that $S(R_1(l)) \leq S_{R1}{}^l$. All non-selected quality increments in $R_1(l)$ are discarded. The same operation is performed for $G_1(l)$ and $B_1(l)$. Then, quality increments are selected from those remaining in $A_3(l)$ having largest significance values so that $S(A_3(l)) \leq S_{A3}{}^l$. Non-selected quality increments are discarded.

After all images are so processed, quality increments from $A_3$ are chosen having largest significance values such that $S(A_3)=S_{A3}{}^S$ within a tolerance (step 41). The unselected quality increments are discarded. The selected quality increments are then used to form the codestream.

As described in previous examples, the iterative approach is very similar except that quality increments from $A_3(l)$ having significance values below a threshold $T_3$ are discarded in step 34.

It is interesting to consider forming the codestream from this example in two layers. One method satisfies the requirements above for the two layers together by selecting quality increments as described above. It divides these quality increments into two layers. A simple case might require $S_1(A_3(l)) \leq S_{A4}{}^l$ and $S_1(A_3) \leq S_{A4}{}^S$ for the first layer where $S_{A4}{}^l < S_{A3}{}^l$ and $S_{A4}{}^S < S_{A3}{}^S$. Other cases are similar. For this case, quality increments for the first layer can be selected as follows. For each image, the quality increments selected as described above and having largest significance values are selected so that $S_1(A_3(l)) \leq S_{A4}{}^l$. Then, among all those so selected, quality increments are selected so that $S_1(A_3) \leq S_{A4}{}^S$. This latter process of selecting so that $S_1(A_3) \leq S_{A4}{}^S$ can be skipped if there is no sequence-wise requirement on the first layer. The quality increments so selected populate the first layer with the remainder going to the second layer. Those skilled in the art will be readily able to extend this embodiment to include multiple layers.

Another approach to including two layers is to reverse the situation described above. That is the two layer together satisfy $S_2(A_3(l)) \leq S_{A4}{}^l$ and (perhaps) $S_2(A_3) \leq S_{A4}{}^S$ where $S_{A4}{}^l > S_{A3}{}^l$ and $S_{A4}{}^S > S_{A3}{}^S$. The first layer is then chosen to satisfy the requirements as originally set out in Example 6. A one-pass method to satisfy these requirements is as follows. Two-pass and iterative methods are similar. First, quality increments are selected to satisfy the requirements for the two layers together. Specifically, for each image, quality increments having largest significance values are selected so that $S_2(A_3(l)) \leq S_{A4}{}^l$, discarding all others. It then selects from all quality increments remaining in $A_3$ those having largest significance values so that $S_2(A_3) \leq S_{A4}{}^S$. (Selecting to satisfy $S_2(A_3) \leq S_{A4}{}^S$ can be skipped if this requirement is not present.) All quality increments so selected go into the admissible codestream. The remainder are discarded. Of the quality increments in the admissible codestream, those that belong in the first layer can be chosen using the embodiment set out above for satisfying the original requirements of Example 6. Extension to more than two layers is straight forward.

Example 7

Alternate Significance Values

A common method for performing rate control in non-scalable compression schemes is to quantize with an initial step-size and code all coefficient data, then iterate quantization and coding for different step-sizes until requirements are met. This is typically used only for one subset (comprising the whole image). A one-pass embodiment of the present invention can achieve the same effect for multiple subsets and/or multiple requirements by using bitplane numbers as significance values. The resulting rate allocation attempts to maximize the number of bitplanes included from the relevant subsets, subject to the LOR. The result would be equivalent to using a fixed quantizer step-size for each coefficient in a subset. The effective step-size is then $2^p\Delta$ where $\Delta$ is the actual step-size used in step 31 and p is the number of bit-planes discarded within the subset. This approach may require a large tolerance on desired sequence-wise sizes. If this is unacceptable, iteration could then be performed. It is likely that only one additional pass is necessary. This is because, the desired final $\Delta$ is guaranteed to lie between $2^p\Delta$ and $2^{p-1}\Delta$ where p is the minimum number of bitplanes that when discarded (step 41) gives a sequence-wise size less than that desired. Interpolation of these two values can then be used so that the next pass is likely to yield a sequence-wise size within a reasonable tolerance of the desired size. Interpolation can be linear or non-linear. The relationship that $\Delta$ is often proportional to $C^{size}$ for some constant C can be helpful in this regard.

Other Examples

The seven examples detailed above represent only some of the possible constructs for rate control and some of the possible requirements. For example, each image in the sequence could be spatially segmented into two regions referred to as foreground and background, which need not be connected and need not be static between images, and have different levels of quality after decompression. In this case, the coding units corresponding to the foreground and background are separated into different subsets and processed using the one-pass, two-pass or iterative algorithms. One possible requirement could be that the total size of the compressed data contributed by the coding units in a given subset is between an upper bound and a lower bound. Also, requirements may be changed for groups (mini-sequences) of images. This may be useful for editing applications or transmission over time-varying communication channels.

Exemplary Applications of Rate Control

There are many other possible applications of the rate control techniques described herein to construct codestreams that exhibit high average reconstructed image quality or small compressed sizes while satisfying a LOR for subsets of the images. A few exemplary applications are reviewed below.

Rate Control for Post-Release Modifications

Suppose that sometime after a sequence is coded, it is desired to replace one or more images. Each replacement image can be individually coded to have the same number of bytes in each subset as those for the image it is replacing using the teachings of the present invention. Alternately, the replacement images can be coded as a sequence, even though they may be from temporally disparate locations within the full sequence. The sequence-wise desired sizes for the replacement "sequence" might be chosen to match those of the images being replaced.

Rate Control for Archiving and/or Compressed Workflow

Figure 8:
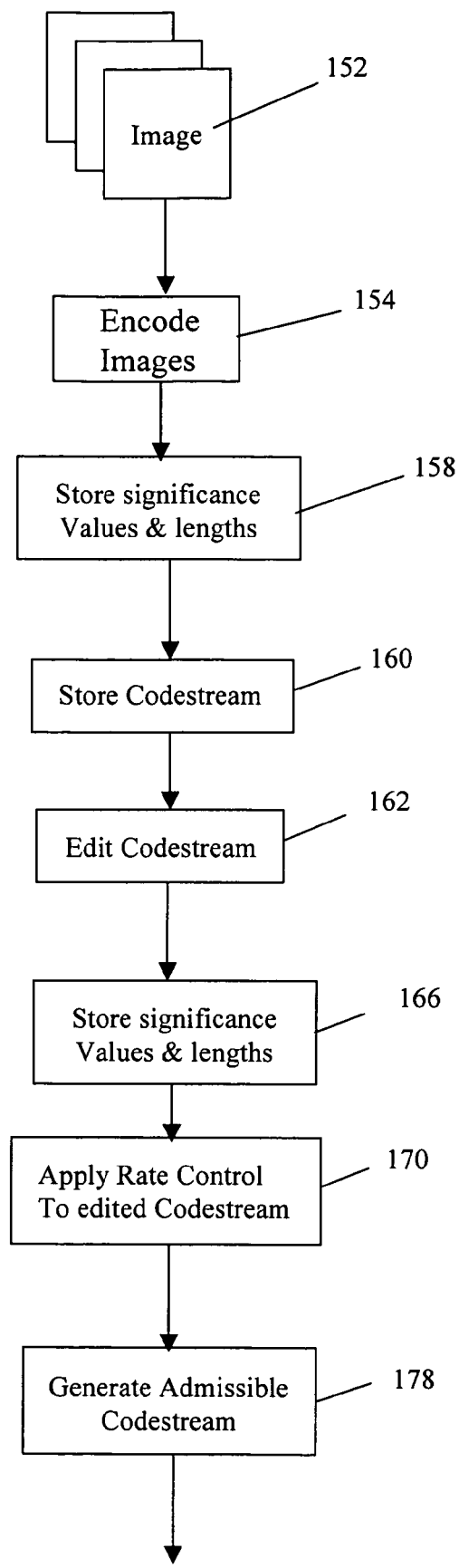
FIG. 8 is a flow diagram illustrating the integration of rate control in the DI workflow process.
Figure 9:
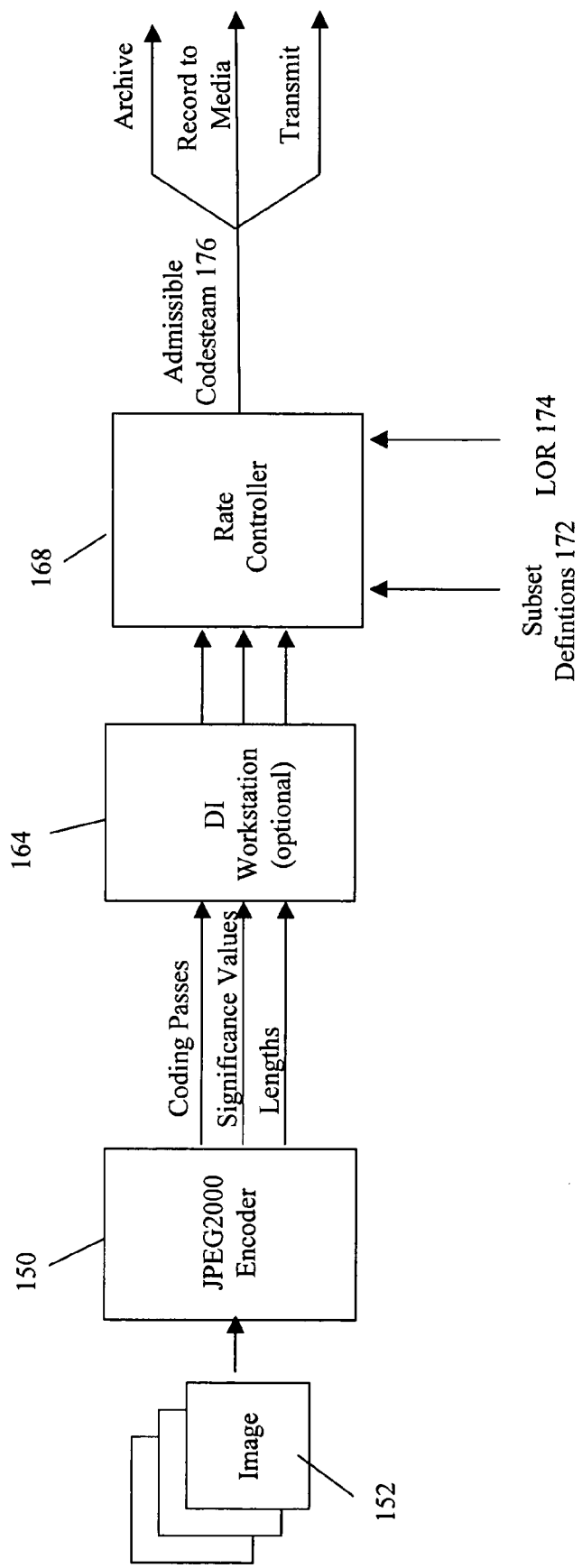
FIG. 9 is a system diagram of an encoder, DI Workstation and rate controller.

In copending U.S. patent application Ser. No. 11/051,771 filed on Feb. 4, 2005 hereafter referred to as "DI Workflow", which is hereby incorporated by reference, a JPEG2000 compressed workflow is described. The techniques described herein for rate control can be used in that environment. Any editing of the image sequence and/or images of the sequence can be carried out using uncompressed data prior to any coding/rate allocation. But preferably, as shown in FIGS. 8 and 9, a JPEG2000 encoder 150, or more generally a scalable encoder, encodes each image 152 (step 154) (preferably to very high quality, perhaps lossless) and stores the significance values and lengths (step 158) for all quality increments, corresponding to steps 31 and 32 in FIG. 2. The compressed quality increments are also stored (preferably in JPEG2000 codestreams, but other data structures are possible) (step 160).

The stored data might serve as a high quality compressed archive for subsequent rate allocation and/or editing. If editing is desired, the images can be decompressed, edited, then recompressed, or editing operations (step 162) can be carried out by a DI workstation 164 using the compressed codestreams as described in DI Workflow. The quality increments are stored (step 160) with their significance values. The sequence of images may be edited by extracting coding units and decoding them to render proxy images, editing the proxy images, and applying the edits to the coded images to update the stored quality increments and significance values. Significance values and lengths are stored (step 166) for any newly generated (replacement) quality increments. Once editing is complete, the stored data might again be used as a high quality archive. When it is desired to perform rate allocation, a rate controller 168 applies the rate control techniques (step 170) to the edited (or archived) codestream subject to subset definitions 172 and LOR 174 and generates the admissible codestream 176 (step 178), which may be archived or recorded to media or transmitted over a channel.

To perform the rate control, it is possible to decompress and then recompress using the techniques as taught by the present invention. Preferably, no decompression/recompression is carried out. The one-pass algorithm can simply proceed by performing step 34 on all compressed images then proceeding on to step 36. Alternately, since all images are already compressed and stored, steps 34 and 36 may be carried out concurrently. It is clear that more than one admissible codestream can be created in this manner, each version corresponding to a different LOR. A record can be kept of each codestream so generated, without storing the generated codestreams themselves. One such method stores the relevant significance thresholds used to satisfy each image-wise and sequence-wise requirement. As configured in FIGS. 8 and 9, the compression, editing and rate control operations are performed by the JPEG2000 encoder 150, a DI Workstation 164, and a rate controller 168. However, these operations may be integrated into a single workstation.

The embodiment above describes saving quality increments with their significance values and lengths. These lengths are useful in satisfying size requirements. If quality requirements are to be satisfied instead (or additionally), quality increment distortion decreases might be saved instead of (or in addition to) quality increment lengths.

Alternate Rate Control for Archiving

As described above an archive might contain all quality increments with their significance values and lengths. This yields tremendous flexibility to create different admissible codestreams at a later time for different subset and LOR definitions (possibly unknown at the time steps 31 and 32 are carried out). On the other hand, once all subsets and LOR definitions of interest are known, an admissible codestream of very high quality, perhaps lossless, may created and stored as an alternate archive. Using the rate control techniques described herein (with one simple case given in Example 6), the archive can be created to contain different layers satisfying different LORs for different subset definitions. Various admissible codestreams satisfying the various LOR can then be extracted at later dates without the need for any further rate allocation.

While several illustrative embodiments of the invention have been shown and described, numerous variations and alternate embodiments will occur to those skilled in the art. For example, it is possible to apply the embodiments of this invention to a subset of the images in the sequence to reduce computations. The initial set of parameters estimated using a subset of all images can then be applied to the full image sequence. This methodology can result in significant computational savings. Furthermore, some embodiments may be applied to a single image. Additionally, the embodiments are applicable when temporal prediction or temporal transforms are employed. In these cases, the techniques are applied to the prediction error images or temporally transformed images. In the case of a temporal transform, the subsets may be defined on a group of temporally transformed images. For example, consider a three level temporal wavelet transform. In this case, eight temporally transformed images correspond nominally to eight original images. Thus, it may be useful to define subsets applicable to eight temporally transformed images. Such variations and alternate embodiments are contemplated, and can be made without departing from the spirit and scope of the invention as defined in the appended claims.

We claim:

1. A method of rate control for one or more images transformed to obtain transform coefficients, which are partitioned into coding units that are each coded in a plurality of quality increments having respective significance values, comprising:
   defining subsets as collections of coding units including a first subset and a second subset that include different collections of coding units, at least one of said first or second subsets including two or more coding units and at least one image contributing one or more coding units to each of said first and second subsets;
   setting a list of requirements (LOR) for the subsets, said LOR including a first size requirement for said first subset and a second size requirements for said second subset, said first and second size requirements being different;
   using the significance values to select with a rate controller quality increments to satisfy the first size requirement for the first subset and the second size requirement for the second subset; and
   constructing an admissible codestream for said one or more images from the selected quality increments.

2. The method of claim 1, wherein at least said first and second subsets include the same coding unit.

3. The method of claims 1 or 2, wherein the images are coded using JPEG2000 in which the coding units are codeblocks and the quality increments are coding passes.

4. The method of claims 1 or 2, wherein the significance values are one of distortion-rate slopes, bitplane numbers, quality increment numbers, a function of bitplane numbers, or a function of quality increment numbers.

5. The method of claims 1 or 2, wherein the admissible codestream includes two or more layers, one or more layers together satisfy said first and second size requirements.

6. The method of claim 5, further comprising dividing the admissible codestream into two or more files, each file containing the data from one or more layers.

7. The method of claims 1 or 2, wherein each said quality increments has a length, said quality increments with the highest significance values are selected until the total length of the selected increments satisfies the size requirement for said subset.

8. The method of claims 1 or 2, wherein at least one entry in the LOR is a quality requirement for a subset, wherein the quality increments with the highest significance values are selected subject to the quality requirement.

9. The method of claims 1 or 2, wherein the LOR further includes at least one entry that is a quality requirement, and wherein the quality increments with the highest significance values are selected subject to the size and quality requirements.

10. The method of claim 1, wherein the first subset is an image-wise subset defined as a collection of coding units from an individual image and the second subset is a sequence-wise subset defined as collections of coding units from every image in a sequence of a plurality of said images and wherein the LOR includes an image-wise requirement and a sequence-wise requirement, said quality increments selected by:
    For said first subset and any other image-wise subsets, selecting with a rate controller quality increments to satisfy their image-wise requirements in the LOR; and
    For said second subset and any other sequence-wise subsets, selecting with a rate controller quality increments to satisfy their sequence-wise requirements in the LOR.

11. The method of claim 10, wherein the selection of quality increments produces an admissible codestream having approximately constant quality for at least one sequence-wise subset from image to image.

12. The method of claim 10, wherein the entire admissible codestream for the plurality of images is constructed in one pass.

13. The method of claim 12, wherein quality increments are selected with the rate controller based on their significance values to satisfy the image-wise requirement for the first subset and the selected quality increments are saved for each said image, and then selecting with the rate controller quality increments based on significance values to satisfy the sequence-wise requirement for the second subset, and then constructing the admissible codestream from the selected saved quality increments.

14. The method of claim 10, wherein the entire admissible codestream for the plurality of images is constructed in two passes.

15. The method of claim 14, wherein quality increments are selected with the rate controller based on their significance values to satisfy the image-wise requirement for the first subset and the selected quality increments are discarded and their significance values saved for each said image, and then selecting with the rate controller quality increments based on the saved significance values to satisfy the sequence-wise requirement for the second subset, and then constructing the admissible codestream from the selected quality increments as regenerated by a second encoding pass.

16. The method of claim 10, wherein the admissible codestream is constructed in an iterative process in which the quality increments having the largest significance values are selected with the rate controller to satisfy the image-wise requirement for the first subset and the quality increments having significance values below a significance threshold for each sequence-wise subset are discarded for each said image, and once all images have been processed determines with the rate controller whether all remaining quality increments satisfy any sequence-wise requirements for the relevant subsets including the second subsets, and iterates the process with the rate controller by varying the significance thresholds until the sequence-wise requirements are met.

17. The method of claim 10, wherein said first image-wise size requirement for the first image-wise subset specifies a maximum size or a desired size.

18. The method of claim 10, wherein said second sequence-wise size requirement specifies a maximum or a desired size.

19. The method of claim 10, wherein said LOR includes an image-wise requirement for each image-wise subset that specifies a maximum size and a sequence-wise requirement for each sequence-wise subset that specifies a maximum size or a desired size.

20. The method of claim 10, wherein the admissible codestream can reconstruct the plurality of images at a first lower resolution and a second higher resolution, said subsets including a first sequence-wise subset that includes all coding units needed to reconstruct the sequence of images at the first lower resolution and a second sequence-wise subset that includes all additional coding units needed to reconstruct the sequence of images at the second higher resolution, said LOR including first and second sequence-wise size requirements for said first and second sequence-wise subsets.

21. The method of claim 10, wherein the admissible codestream includes two layers and can reconstruct the plurality of images at a first lower resolution and a second higher resolution, the first layer of the first resolution satisfying a first sequence-wise requirement and the entire sequence satisfying a second sequence-wise requirement.

22. The method of claim 10, wherein said subsets include for each image first, second and third image-wise subsets that include all coding units needed to reconstruct each of three color components of the image, said LOR including image-wise size requirements for each of the first, second and third image-wise subsets.

23. The method of claim 10, wherein for each image the first and second subsets are image-wise subsets that comprise the coding units needed to reconstruct different spatial regions of the image.

24. The method of claim 23, wherein the sequence includes a plurality of images, further including a sequence-wise subset defined as the union of the image-wise subsets therein.

25. The method of claim 1, wherein said first and second subjects are sequence-wise subsets defined as different collections of coding units from every image in a sequence of a plurality of said images.

26. The method of claim 1, wherein said first and second subsets are image-wise subsets defined as different collections of coding units from an individual image.

27. The method of claims 1 or 2, further comprising, after the admissible codestream is constructed, receiving a replacement for one or more images and coding the replacement images so that the size of one or more subsets for the replacement images match those of the images being replaced.

28. The method of claims 1 or 2, for a sequence including a plurality of images, further comprising,
storing quality increments with their significance values in an archive;
thereafter defining the subsets and setting different LOR for multiple applications;
said rate controller using the significance values to select the quality increments to satisfy the different LOR for the defined subsets for each of the multiple applications; and
constructing a different admissible codestream from the selected quality increments for each of the multiple applications.

29. The method of claim 1, wherein each said image has a resolution of at least 2048 by 1080, said rate controller selecting quality increments for each said image.

30. The method of claim 1, further comprising:
causing the admissible codestream to be displayed as a sequence of one or more said images.

31. A method of rate control for images transformed to obtain transform coefficients, which are partitioned into coding units that are each coded in a plurality of quality increments having respective significance values, comprising:
storing quality increments with their significance values;
editing the sequence of images by extracting coding units and decoding them to render proxy images, editing the proxy images, and applying the edits to the coded images to update the stored quality increments and significance values; and
defining subsets as collections of coding units, at least one image contributing one or more coding units to each of two or more subsets;
setting a list of requirements (LOR), each subset having one or more requirements;
using the significance values to select with a rate controller quality increments to satisfy the LOR for each subset; and
constructing an admissible codestream from the selected quality increments.

32. A method rate control for images transformed to obtain transform coefficients, which are partitioned into coding units that are each coded in a plurality of quality increments having respective significance values, comprising:
defining subsets as collections of coding units including image-wise subsets defined on individual images or sequence-wise subsets defined on the entire sequence of images, said subsets including for each image first, second and third image-wise subsets that include all coding units needed to reconstruct each of three color components of the image and a fourth image-wise subset that is the union of the three color subsets, at least one image contributing one or more coding units to each of two or more subsets;
setting a list of requirements (LOR) including image-wise and/or sequence-wise requirements including maximum image-wise size requirements for each of the first, second and third image-wise subsets and an image-wise size requirement for the fourth image-wise subset, each subset having one or more requirements;
using the significance values to select with a rate controller quality increments to satisfy the image-wise and sequence-wise requirements for any image-wise subsets and any sequence-wise subsets; and
constructing an admissible codestream from the selected quality increments.

33. The method of claim 32, wherein said image-wise size requirement for said fourth image-wise subset is a maximum size requirement.

34. The method of claim 33, wherein said sequence includes a plurality of images, said subsets further include a sequence-wise subset including all coding units of all images in the sequence and the LOR includes a sequence-wise size requirement for said sequence-wise subset.

35. The method of claim 32, wherein the admissible codestream can reconstruct the images at a first lower resolution and a second higher resolution, said first, second and third image-wise subsets including all coding units needed to reconstruct each of three color components of the image at the first lower resolution and said fourth image-wise subset including all coding units.

36. The method of claim 35, wherein the admissible codestream includes two or more layers, the layers together satisfying the requirements therein, one or more lower layers satisfying for each image image-wise size requirements on the fourth image-wise subset.

37. The method of claim 36, further comprising dividing the admissible codestream into two or more files, each file containing the data from one or more layers.

38. The method of claim 35, wherein the image-wise size requirement for the fourth image-wise subset is a maximum image-wise size requirement.

39. The method of claim 38, wherein said sequence includes a plurality of images, said subsets further include a sequence-wise subset that includes all coding units of all images and the LOR includes a sequence-wise size requirement for said sequence-wise subset.

40. The method of claim 39, wherein the admissible codestream includes two or more layers, the layers together satisfying the requirements therein, one or more lower layers satisfying for each image image-wise size requirements on the fourth image-wise subset.

41. The method of claim 40, one or more lower layers further satisfying sequence-wise size requirements for said sequence-wise subset.

42. The method of claim 39, wherein the admissible codestream includes two more layers, one or more lower layers together satisfying the requirements therein.

43. The method of claim 42, wherein the sequence includes a plurality of images, one or more lower layers further satisfying sequence-wise size requirements for said sequence-wise subset.

44. The method of claim 35, wherein the admissible codestream includes two more layers, one or more lower layers together satisfying the requirements therein.

45. The method of claim 44, further comprising dividing the admissible codestream into two or more files, each file containing the data from one or more layers.

46. A method of rate control for a plurality of images transformed to obtain transform coefficients, which are partitioned into coding units that are each coded in a plurality of quality increments having respective significance values and lengths, comprising:
Defining a first image-wise subset as a collection of coding units defined on individual images and a second sequence-wise subset as a collection of coding units from every image in the entire sequence of images, at least one of said first or second subsets including two or more coding units and at least one image contributing one or more coding units to each of said first and second subsets;
setting a list of requirements (LOR) for the subsets including an image-wise size requirement for the first image-wise subset and a sequence-wise size requirement for the second sequence-wise subset, said sequence-wise requirement different than said image-wise size requirement; and
in one-pass,
for each coded image, using the significance values to select with a rate controller quality increments for the first image-wise subset and any other image-wise subsets to satisfy the image-wise requirement and any other image-wise requirements in the LOR and saving the selected quality increments and significance values;
for the sequence of images, using the significance values to select with the rate controller quality increments for the second sequence-wise subset and any other sequence-wise subsets to satisfy the sequence-wise size requirement and any other sequence-wise requirements in the LOR; and
constructing an admissible codestream from the selected quality increments.

47. The method of claim 46, wherein said first and second subsets include the same coding unit.

48. The method of claims 46 or 47, wherein a plurality of LOR are set corresponding to a respective plurality of desired layers in the admissible codestream, said quality increments being selected to satisfy each LOR for its corresponding layer.

49. A method of rate control for images transformed to obtain transform coefficients, which are partitioned into coding units that are each coded in a plurality of quality increments having respective significance values and lengths, comprising:
defining image-wise subsets as collections of coding units defined on individual images including for each image first, second and third image-wise subsets that include all coding units needed to reconstruct each of three color components of the image and/or sequence-wise subsets as collections of coding units defined on the entire sequence of images, at least one image contributing one or more coding units to each of two or more subsets;
setting a list of requirements (LOR) including image-wise and/or sequence-wise requirements, each subset having one or more requirements, said LOR including image-wise size requirements for each of the first, second and third image-wise subsets; and
in one-pass,
for each coded image, using the significance values to select with a rate controller quality increments for any image-wise subsets to satisfy any image-wise requirements in the LOR and saving the selected quality increments and significance values;
for the sequence of images, using the significance values to select with the rate controller quality increments for any sequence-wise subsets to satisfy any sequence-wise requirements in the LOR using the rate controller; and
constructing an admissible codestream from the selected quality increments.

50. The method of claim 49, wherein said subsets include a fourth image-wise subset that is the union of the three color subsets, said LOR including maximum image-wise size requirements for each of the first, second and third image-wise subsets and an image-wise size requirement for the fourth image-wise subset.

51. The method of claim 49, wherein the admissible codestream can reconstruct the images at a first lower resolution and a second higher resolution, said first, second and third image-wise subsets including all coding units needed to reconstruct each of the three color components of the image at the first lower resolution and a fourth-image wise subset that includes all coding units of the entire image, said LOR including for each image an image-wise size requirement for the fourth image-wise subset and an image-wise maximum size requirement for each of the first, second and third image-wise subsets.

52. The method of claim 51, wherein the admissible codestream includes two or more layers, the layers together satisfying the requirements therein, one or more lower layers satisfying for each image image-wise size requirements on the fourth image-wise subset.

53. The method of claim 51, wherein the admissible codestream includes two more layers, one or more lower layers together satisfying the requirements therein, one or more lower layers further satisfying image-wise size requirements on the fourth image-wise subset.

54. A system for generating an admissible codestream, comprising:
an encoder adapted to receive an input sequence of one or more images and transform them to obtain transform coefficients that are partitioned into coding units, which are each coded in a plurality of quality increments having respective significance values and lengths; and a rate controller adapted to receive subsets definitions defining collections of coding units including a first subset and a second subset that include different collections of coding units in which at least one of said first or second subset includes two or more coding units and at least one image contributes one or more coding units to each of said first and second subsets, and to receive a list of requirements (LOR) for the subsets including a first size requirement for the first subset and a different second size requirement for the second subset, said rate controller using the significance values to select quality increments that satisfy the LOR for the relevant subsets and constructing an admissible codestream from the selected quality increments.

55. The system of claim 54, wherein said first and second subsets include the same coding unit.

56. The system of claims 54 or 55, wherein the first subset is an image-wise subset defined as a collection of coding units from individual images and the second subset is a sequence-wise subset defined as collections of coding units from every image in the entire sequence of the plurality of images, said rate controller selecting the quality increments by:

For said first subset and any other image-wise subsets, selecting quality increments to satisfy their image-wise requirements in the LOR; and for said second subset and any other sequence-wise subsets, selecting quality increments to satisfy their sequence-wise requirements in the LOR.

57. A system for generating an admissible codestream, comprising:

an encoder adapted to receive an input sequence of one or more images and transform them to obtain transform coefficients that are partitioned into coding units, which are each coded in a plurality of quality increments having respective significance values and lengths;

storage for storing quality increments with their significance values;

a digital intermediate workstation for editing the sequence of images, said workstation configured to extract coding units and decode them to render proxy images, enable editing of the proxy images and apply the edits to the coded images to update the stored quality increments and significance values; and a rate controller adapted to receive subsets definitions defining collections of coding units in which at least one image contributes one or more coding units to each of two or more subsets, and to receive a list of requirements (LOR) for the subsets, each subset having one or more requirements, said rate controller using the significance values to select quality increments from storage that satisfy the LOR for the relevant subsets and constructing an admissible codestream from the selected quality increments.

58. The system of claim 57, wherein the subsets further include a fourth image-wise subset that is the union of the three color subsets, said LOR including an image-wise size requirement for the fourth image-wise subset.

59. A system for generating an admissible codestream, comprising:

an encoder adapted to receive an input sequence of one or more images and transform them to obtain transform coefficients that are partitioned into coding units, which are each coded in a plurality of quality increments having respective significance values and lengths; and a rate controller adapter to receive subsets definitions defining collections of coding units in which at least one image contributes one or more coding units to each of two or more subsets, said subsets including for each image first, second and third image-wise subsets that include all coding units needed to reconstruct each of three color components of the image, and to receive a list of requirements (LOR) for the subsets including image-wise size requirements for each of the first, second and third image-wise subsets, said rate controller using the significance values to select quality increments that satisfy the image-wise size requirements for the respective image-wise subsets and constructing an admissible codestream from the selected quality increments.

60. A system for generating an admissible codestream, comprising:

an encoder adapted to receive an input sequence of a plurality of images and transform them to obtain transform coefficients that are partitioned into coding units, which are each coded in a plurality of quality increments having respective significance values and lengths;

an archive for storing all quality increments with their significance values for the plurality of images as a compressed archive at an archive bit rate and reconstructed archive image quality; and a rate controller adapter to receive subsets definitions defining collections of coding units including a first subset and a second subset that include different collections of coding units, at least one of said first or second subsets including two or more coding units and at least one image contributes one or more coding units to each of said first and second subsets, and to receive a list of requirements (LOR) for the subsets, said LOR including a first size requirement for said first subset and a second size requirement for said second subset, said first and second size requirements being different, said rate controller using the significance values to select less than all said quality increments from the archive that satisfy the first size requirement for the first subset and the second size requirement for the second subset and constructing an admissible codestream for said plurality of images from the selected quality increments, said admissible codestream having a bit rate less than the archive bit rate and reconstructed image quality less than the reconstructed archive image quality.

* * * * *